United States Patent
Kim et al.

(10) Patent No.: US 12,549,235 B2
(45) Date of Patent: Feb. 10, 2026

(54) METHOD AND APPARATUS FOR PERFORMING COMMUNICATION IN WIRELESS COMMUNICATION SYSTEM

(71) Applicant: Samsung Electronics Co., Ltd., Gyeonggi-do (KR)

(72) Inventors: Wonjun Kim, Gyeonggi-do (KR); Suhwook Kim, Gyeonggi-do (KR); Seunghyun Lee, Gyeonggi-do (KR); Juho Lee, Gyeonggi-do (KR); Hyeondeok Jang, Gyeonggi-do (KR)

(73) Assignee: Samsung Electronics., Ltd (KR)

( * ) Notice: Subject to any disclaimer, the term of this patent is extended or adjusted under 35 U.S.C. 154(b) by 329 days.

(21) Appl. No.: 18/334,835

(22) Filed: Jun. 14, 2023

(65) Prior Publication Data
US 2023/0421225 A1    Dec. 28, 2023

(30) Foreign Application Priority Data

Jun. 22, 2022  (KR) .................. 10-2022-0076374
Apr. 18, 2023  (KR) .................. 10-2023-0050811

(51) Int. Cl.
*H04B 7/06*   (2006.01)
*H04L 5/00*   (2006.01)

(52) U.S. Cl.
CPC ......... *H04B 7/0626* (2013.01); *H04B 7/0628* (2013.01); *H04B 7/063* (2013.01); *H04L 5/0051* (2013.01)

(58) Field of Classification Search
CPC .... H04B 7/0626; H04B 7/0628; H04B 7/063; H04L 5/0051; H04L 1/0015;
(Continued)

(56) References Cited

U.S. PATENT DOCUMENTS 10,103,798  B2   10/2018  Rahman et al.
2021/0050895  A1   2/2021  Kang et al.
(Continued)

FOREIGN PATENT DOCUMENTS

KR      10-2039640      11/2019
KR     10-2022-0022801   2/2022
(Continued)

OTHER PUBLICATIONS

Huawei, HiSilicon, "Evaluation on AI/ML for CSI Feedback Enhancement", R1-2203140, 3GPP TSG-RAN WG1 Meeting #109-e, May 9-20, 2022, 13 pages.
(Continued)

*Primary Examiner* — Rownak Islam
(74) *Attorney, Agent, or Firm* — The Farrell Law Firm, P.C.

(57) ABSTRACT

Disclosed is a $5^{th}$ generation (5G) or $6^{th}$ generation (6G) communication system for supporting higher data rates after a $4^{th}$ generation (4G) communication systems such as long term evolution (LTE). An operating method of a base station includes receiving, from a user equipment (UE), information about channel state information (CSI) measured based on a first CSI-reference signal (RS), determining, based on the information about the CSI, one autoencoder (AE), from among a plurality of AEs, transmitting, to the UE, information indicating an encoder included in the determined AE, transmitting a second CSI-RS to the UE, receiving, from the UE, CSI compressed based on CSI measured using the second CSI-RS and the indicated encoder, and performing reconstruction based on the compressed CSI and a decoder included in the determined AE.

17 Claims, 13 Drawing Sheets

(58) Field of Classification Search
CPC ... H04L 1/0023; H04L 1/0026; H04L 1/0029; H04L 5/0057
USPC .......................................................... 370/252
See application file for complete search history.

(56) References Cited

U.S. PATENT DOCUMENTS

| | | | |
|---|---|---|---|
| 2021/0195462 A1 | 6/2021 | Pezeshki et al. | |
| 2021/0273706 A1 | 9/2021 | Zeng et al. | |
| 2021/0273707 A1 | 9/2021 | Yoo et al. | |
| 2021/0320471 A1 | 10/2021 | Zhu et al. | |
| 2022/0058081 A1 | 2/2022 | Lee et al. | |
| 2022/0094411 A1 | 3/2022 | Yoo et al. | |
| 2022/0104213 A1 | 3/2022 | Song et al. | |
| 2022/0149904 A1 | 5/2022 | Timo et al. | |
| 2023/0308920 A1* | 9/2023 | Manolakos | G06N 3/088 |
| 2024/0313839 A1* | 9/2024 | Lindbom | H04L 1/0033 |
| 2025/0047346 A1* | 2/2025 | Timo | H04L 5/0057 |

FOREIGN PATENT DOCUMENTS

| | | | |
|---|---|---|---|
| KR | 10-2022-0042927 | 4/2022 | |
| WO | WO 2022/040046 | 2/2022 | |
| WO | WO 2022/045390 | 3/2022 | |
| WO | WO 2022/056502 | 3/2022 | |
| WO | WO-2022056503 A1 * | 3/2022 | G06N 3/045 |
| WO | WO 2022/089522 | 5/2022 | |

OTHER PUBLICATIONS

Apple Inc., "Discussion on Other Aspects of AI/ML for CSI Enhancement", R1-2204239, 3GPP TSG-RAN WG1 Meeting #109-e, May 9-20, 2022, 6 pages.

NTT Docomo, Inc., "Discussion on Other Aspects on AI/ML for CSI Feedback Enhancement", R1-2204376, 3GPP TSG-RAN WG1 Meeting #109-e, May 9-20, 2022, 4 pages.

International Search Report dated Sep. 19, 2023 issued in counterpart application No. PCT/KR2023/008273, 9 pages.

Vivo, "Other Aspects on AI/ML for CSI Feedback Enhancement", R1-2203551, 3GPP TSG RAN WG1 #109-e, May 9-20, 2022, 10 pages.

European Search Report dated Jun. 4, 2025 issued in counterpart application No. 23827447.6-1206, 10 pages.

* cited by examiner

METHOD AND APPARATUS FOR PERFORMING COMMUNICATION IN WIRELESS COMMUNICATION SYSTEM

CROSS-REFERENCE TO RELATED APPLICATION(S)

This application is based on and claims priority under 35 U.S.C. § 119 to Korean Patent Application No. 10-2022-0076374, which was filed in the Korean Intellectual Property Office on Jun. 22, 2022, and Korean Patent Application No. 10-2023-0050811, which was filed in the Korean Intellectual Property Office on Apr. 18, 2023, the disclosure of each of which is incorporated herein by reference in its entirety.

BACKGROUND

1. Field

The disclosure relates generally to a method and apparatus for performing communication in a wireless communication system, and more particularly, to a method and apparatus for adaptively transmitting and receiving compressed channel state information (CSI) to report the CSI in a wireless communication system.

2. Description of the Related Art

Considering the history of the development of wireless communication, technologies have been developed mainly for services targeting humans, such as voice calls, multimedia services, and data services. Connected devices, which have proliferated since the commercialization of fifth generation (5G) communication systems, are expected to be connected to communication networks. Examples of things connected to networks may include vehicles, robots, drones, home appliances, displays, smart sensors installed in various infrastructures, construction machinery, and factory equipment. Mobile devices are expected to evolve in various form factors such as augmented reality (AR) glasses, virtual reality headsets, and holographic devices. In the sixth generation (6G) era, efforts are being made to develop improved 6G communication systems to provide various services by connecting hundreds of billions of devices and things. For this reason, sixth generation (6G) communication systems are referred to as beyond 5G systems.

In 6G communication systems, which are predicted to be realized around 2030, a peak data rate is 1 tera (i.e., 1,000 giga) bps, and a wireless latency time is 100 microseconds (μsec). That is, a data rate in 6G communication systems is 50 times higher than that in 5G communication systems, and a wireless latency time is reduced to ¹⁄₁₀.

In order to achieve such a high data rate and an ultra-low latency time, it is considered to implement 6G communication systems in a terahertz (THz) band (e.g., 95 gigahertz (GHz) to 3 THz bands). It is expected that, due to more severe path loss and atmospheric absorption in terahertz bands than those in millimeter wave (mmWave) bands introduced in 5G, it will be important for technologies to be capable of ensuring the signal transmission distance (i.e., coverage). It is necessary to develop, as major technologies for securing the coverage, radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas.

There has been ongoing discussion on new technologies for improving the coverage of terahertz-band signals, such as metamaterial-based lenses and antennas, high dimensional spatial multiplexing using orbital angular momentum (OAM), and a reconfigurable intelligent surface (RIS).

To improve frequency efficiency and system network performance, the following technologies have been developed for 6G communication systems: full-duplex technology for enabling an uplink transmission and a downlink transmission to simultaneously use the same frequency resource, network technology for utilizing satellites and high-altitude platform stations (HAPS) in an integrated manner, an improved network structure for supporting mobile base stations (BSs) and enabling network operation optimization and automation, dynamic spectrum sharing technology via collision avoidance based on a prediction of spectrum usage, artificial intelligence (AI)-based communication technology for system optimization by utilizing AI from a designing phase and internalizing end-to-end AI support functions, and next-generation distributed computing technology for providing services of complexity beyond the limit of user equipment (UE) computing ability through super-high-performance communication and computing resources (such as mobile edge computing (MEC) and clouds). In addition, through designing new protocols to be used in 6G communication systems, developing mechanisms for implementing a hardware-based security environment and safe use of data, and developing technologies for maintaining privacy, attempts to strengthen connectivity between devices, optimize a network, promote softwarization of network entities, and increase the openness of wireless communication are continuing.

It is expected that research and development of 6G communication systems in hyper-connectivity, including person to machine as well as machine to machine will result in the next hyper-connected experience. Particularly, it is expected that services such as truly immersive extended reality (XR), high-fidelity mobile hologram, and digital replica could be provided through 6G communication systems. Also, services such as remote surgery for security and reliability enhancement, industrial automation, and emergency response will be provided through 6G communication systems and applied in various fields such as industry, medical care, automobiles, and home appliances.

Although the related art teaches an autoencoder (AE), it is noted that the related art AE is insufficient in performance since it fails to consider such parameters as UE capability or network environments.

As such, there is a need in the art for an AE that is determined by considering capability of a UE or a network environment of the UE and indicating an encoder included in the determined AE, so as to improve the performance of CSI reporting.

SUMMARY

This disclosure is provided to address at least the above-mentioned problems and/or disadvantages and to provide at least the advantages described below.

Accordingly, an aspect of the disclosure is to provide technology in which a BS determines an AE suitable for an environment of a UE and indicates an encoder for compressing CSI data.

Another aspect of the disclosure is to provide a method and apparatus for performing communication in a wireless communication system by transmitting and receiving compressed CSI to report the CSI.

In accordance with an aspect of the disclosure, an operating method of a BS in a wireless communication system includes receiving, from a UE, information about CSI measured based on a first CSI-reference signal (RS), determining, based on the information about the CSI, one AE comprising an encoder that compresses at least one CSI data between the BS and the UE and a decoder that reconstructs the compressed at least one CSI data, from among a plurality of AEs, transmitting, to the UE, information indicating the encoder included in the determined AE, transmitting a second CSI-RS to the UE, receiving, from the UE, CSI data compressed based on CSI measured using the second CSI-RS and the indicated encoder; and performing reconstruction based on the compressed CSI data and a decoder included in the determined AE.

In accordance with an aspect of the disclosure, an operating method of a UE in a wireless communication system includes transmitting, to a BS, information about CSI measured based on a first CSI-RS, receiving, from the BS, information indicating an encoder included in one AE determined based on the information about the CSI from among a plurality of AEs, and transmitting, to the BS, CSI compressed based on CSI measured using a second CSI-RS and the indicated encoder.

In accordance with an aspect of the disclosure, a BS in a wireless communication system includes a transceiver and at least one processor coupled with the transceiver and configured to receive, from a UE, information about first CSI measured based on a first CSI-RS, determine one AE from among a plurality of AEs based on the information about the first CSI, transmit, to the UE, information indicating an encoder included in the determined AE, transmit, to the UE, a second CSI-RS, receive, from the UE, CSI compressed based on second CSI measured using the second CSI-RS and the indicated encoder, and perform reconstruction based on the compressed CSI and a decoder included in the determined AE.

In accordance with an aspect of the disclosure, a UE in a wireless communication system includes a transceiver and at least one processor coupled with the transceiver and configured to transmit information about first CSI measured based on a first CSI-RS, receive, from a BS, information indicating an encoder included in one AE determined based on the information about the first CSI from among a plurality of AEs, and transmit, to the BS, CSI compressed based on second CSI measured using a second CSI-RS and the indicated encoder.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
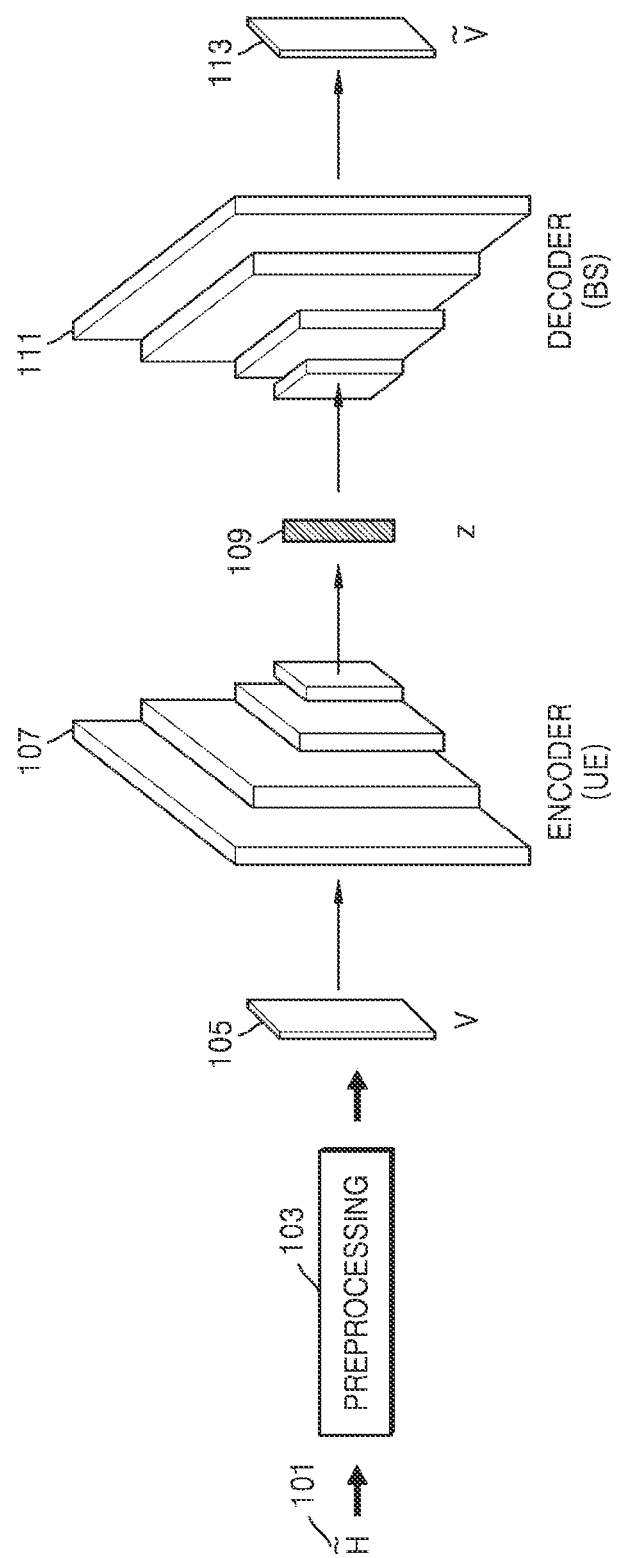
FIG. 1A illustrates a process of transmitting and receiving compressed CSI, according to an embodiment.

Hereinafter, embodiments of the disclosure will be described in detail with reference to the accompanying drawings.

In describing embodiments of the disclosure, descriptions related to technical contents well-known in the art and not associated directly with the disclosure will be omitted for the sake of clarity and conciseness.

Herein, the term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Herein, it will be understood that when elements are "connected" or "coupled" to each other, the elements may be directly connected or coupled to each other, but may alternatively be connected or coupled to each other with an intervening element therebetween, unless specified otherwise.

Regarding an element represented as a ' . . . unit' or a 'module', two or more elements may be combined into one element or one element may be divided into two or more elements according to subdivided functions. In addition, each element described hereinafter may additionally perform some or all of functions performed by another element, in addition to main functions of itself, and some of the main functions of each element may be performed entirely by another component. The phrase "at least one of," when used with a list of items, means that different combinations of one or more of the listed items may be used, and only one item in the list may be needed. For example, "at least one of: A, B, or C" includes any of the following combinations: A, B, C, A and B, A and C, B and C, and A and B and C.

The figures and the related descriptions are by way of example and should not be construed to limit the scope of the disclosure. One of ordinary skill in the art will understand that the principles of the disclosure may be implemented in any suitably arranged system, device, or wireless communication system.

Similarly, some elements in the accompanying drawings are exaggerated, omitted, or schematically illustrated. In addition, the size of each element may not substantially reflect its actual size. In each drawing, the same or corresponding element is denoted by the same reference numeral.

Numerals (e.g., a first, a second, and the like) used in the description of the specification are merely identifier codes for distinguishing one element from another.

The advantages and features of the disclosure, and methods of achieving the same, will become apparent with reference to embodiments of the disclosure described below in detail in conjunction with the accompanying drawings. The disclosure may, however, be embodied in many different forms and should not be construed as limited to embodiments of the disclosure. Instead, these embodiments are provided so that this disclosure will fully convey the scope of the disclosure to one of ordinary skill in the art, and the disclosure is defined only by the accompanying claims. In the specification, the same reference numerals denote the same elements. The terms used herein are those defined in consideration of functions in the disclosure, and may vary according to the intention of users or operators, precedents, etc. Hence, the terms used herein should be defined based on the meaning of the terms together with the descriptions throughout the specification.

Throughout the disclosure, the expression "at least one of a, b or c" indicates only a, only b, only c, both a and b, both a and c, both b and c, all of a, b, and c, or variations thereof.

Throughout the specification, a layer may also be referred to as an entity.

Hereinafter, a BS is a subject configured to perform resource allocation to a terminal, and may be one of a gNode B, an eNode B, a Node B, (or xNode B (x is a character including "g" and "e")), a wireless access unit, a BS controller, a satellite, an air-born vehicle, or a node on a network. A terminal (or UE) may include a mobile station (MS), a vehicle, a satellite, an air-born vehicle, a cellular phone, a smartphone, a computer, or a multimedia system capable of a communication function. In the disclosure, a downlink (DL) denotes a wireless transmission path of a signal transmitted by a BS to a UE, and uplink (UL) denotes a wireless transmission path of a signal transmitted by a UE to a BS. Additionally, there may be a sidelink (SL), which denotes a wireless transmission path of a signal transmitted by a UE to another UE.

Hereinafter, a long term evolution (LTE), a LTE-A, or a 5G system may be described as an example, but an embodiment of the disclosure may also be applied to other communication systems having a similar technical background or channel type. For example, the other communication systems may include a 5G-advance, new radio (NR)-advance, or $6^{th}$ generation mobile communication technology (6G) developed after 5G mobile communication technology (or new radio (NR)), and 5G described below may be a concept including a conventional LTE and LTE-A and other similar services. The disclosure may be applied to other communication systems through some modifications without departing from the scope of the disclosure at the discretion of one of ordinary skill in the art.

The term " . . . unit" used in the present embodiment of the disclosure refers to a software or hardware component, such as a field-programmable gate array (FPGA) or an application-specific integrated circuit (ASIC), which performs certain tasks. However, the term " . . . unit" does not mean to be limited to software or hardware. A " . . . unit" may be configured to be in an addressable storage medium or may be configured to operate one or more processors. Thus, a " . . . unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in components and " . . . units" may be combined into fewer components and " . . . units" or may be further separated into additional components and " . . . units". Furthermore, components and " . . . units" may be implemented to operate one or more central processing units (CPUs) in a device or a secure multimedia card. Also, a " . . . unit" in an embodiment of the disclosure may include one or more processors.

Herein, terms indicating broadcast information, terms indicating control information, terms related to communication coverage, terms indicating a change in a state (e.g., an event), terms indicating network entities, terms indicating messages, and terms indicating components of an apparatus are exemplified for convenience of explanation. Accordingly, the disclosure is not limited to the terms described below, and other terms that refer to objects having equivalent technical meanings may be used.

For convenience of explanation below, the terms and names defined in LTE and NR standards, which are the latest standards defined by the $3^{rd}$ generation partnership projection (3GPP) organizations among currently existing communication standards, are used. However, the disclosure may not be limited to the terms and names, and may also be applied to systems following other standards.

FIG. 1A illustrates a process of reporting CSI through compressed CSI data, according to an embodiment.

In post LTE communication systems, services that may freely reflect various requirements of users and service providers may be supported. Services considered for beyond 5G systems include enhanced mobile broadband (eMBB), massive machine-type communication (mMTC), and ultra-reliability low-latency communication (URLLC) services. To satisfy various requirements according to services, a system operation method such as adjusting a beam or a method of changing a frequency band may be considered. Various channel environments according to frequency bands or beams may occur in these situations.

A UE may estimate a channel state based on an RS transmitted from a BS. For channel estimation, there may be various RSs transmitted to a UE from a BS. In the disclosure, a CSI-RS will be described as an example for convenience of description. A UE may report CSI to a BS, and a large amount of resources may be consumed in a process of reporting the CSI to the BS. Accordingly, a method for compressing and transmitting CSI is being discussed to reduce resource consumption in a CSI feedback process.

CSI reconstructed through codebook-based CSI feedback may have information loss in a codebook quantization process. For example, when a BS transmits an RS to a UE, the UE may obtain a channel $\hat{H}$ by estimating (channel estimation or channel measurement) a channel state through the received RS. The UE may obtain a relation $\hat{H}=UDV^H$ by using eigen value decomposition (EVD) or singular value decomposition (SVD). When a V value is known, the channel $\hat{H}$ may be obtained from the obtained relation. Accordingly, in codebook-based CSI feedback, the UE transmits PMI that is an index of a codebook most alike the V value. When an index of a codebook similar to the V value, instead of the V value, is transmitted to the BS, an error may occur due to a difference between the preset codebook and the actual V value. In contrast, when a codebook is more diversely configured in order to reduce information loss due to a difference between the preset codebook and the actual V value, the amount of data to be transmitted may increase due to the more diversely configured codebook.

In CSI feedback through CSI compression, the UE (transmitter) may compress and transmit CSI data (V data) through an encoder, and the BS may decode or reconstruct the received compressed CSI data (z data) to obtain reconstructed CSI data ($\tilde{V}$ data).

A BS may transmit a RS to a UE. The RS may include a CSI-RS or a demodulation (DM)-RS.

The UE may obtain CSI 101 based on the received CSI-RS. The CSI 101 may include a channel $\hat{H}$ obtained by measuring a channel state. The UE may perform preprocessing 103 to obtain information about the CSI 105. For example, the preprocessing 103 may include EVD or SVD. The information about the CSI 105 may include information indicating a network environment, such as CSI data (V data) obtained by performing the preprocessing 103 on the channel $\hat{H}$. Alternatively, the information about the CSI 105 may include a network environment ID 503, which will be described in detail with reference to FIG. 5.

Referring to FIG. 1A, an AE may include an encoder 107 and a decoder 111. The encoder 107 may be implemented at a UE side, and the decoder 111 may be implemented at a BS side. Each of the encoder 107 and the decoder 111 may include an AI model. The CSI data (V data) may be input to the encoder 107 of the UE, and may be compressed in the encoder 107 to obtain compressed CSI data (z data) 109. The compressed CSI data 109 may be input to the decoder 111 of the BS, and may be decoded or reconstructed in the decoder 111 to obtain reconstructed CSI data ($\tilde{V}$ data) 113.

For example, an encoder AI model included in the encoder 107 may be used to compress the CSI data (V data) 105 and generate the compressed CSI data (feedback data, z data) 109. A decoder AI model included in the decoder 111 may be used to decode or reconstruct the compressed data 109 received from the UE and generate the reconstructed CSI data ($\tilde{V}$ data) 113. The encoder AI model for compressing the information about the CSI 105 should be jointly trained with the decoder AI model for reconstructing the compressed CSI data 109. When the encoder AI model for compression and the decoder AI model for reconstruction are separately trained, a difference between the information about the CSI 105 to be compressed and information about the reconstructed CSI 113 obtained by reconstruction may increase. Thus, in order to prevent the increase in the difference, the encoder AI model and the decoder AI model may be jointly trained.

Figure 1B:
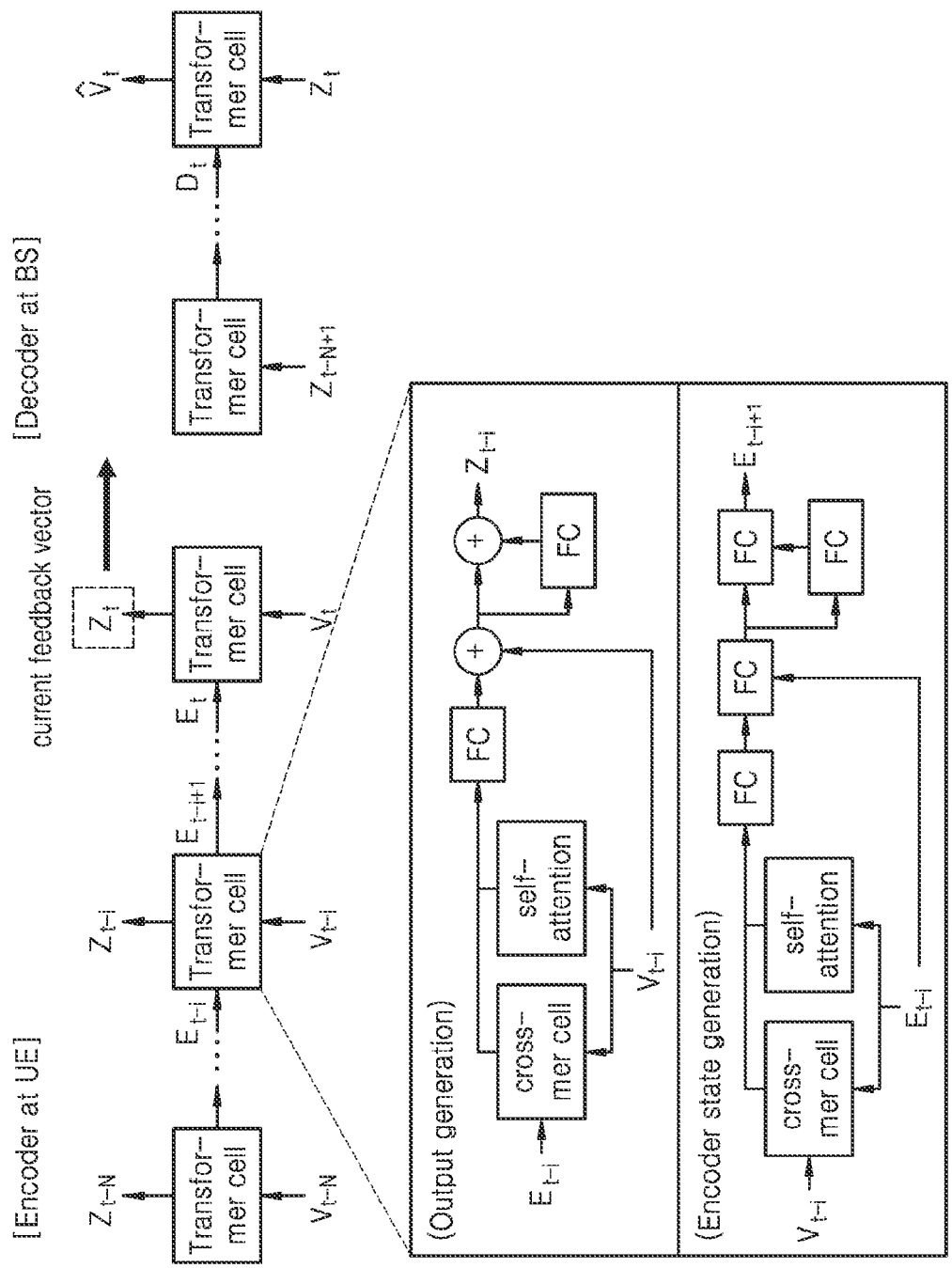
FIG. 1B illustrates a process of obtaining compressed CSI data and reconstructing the compressed CSI data, by using previously compressed CSI data, according to an embodiment.

FIG. 1B illustrates a process of obtaining compressed CSI data and a process of reconstructing the compressed CSI data, by using previously compressed CSI data, according to an embodiment of the disclosure.

According to various embodiments of the disclosure, a UE may obtain compressed CSI data based on information about CSI and information about one or more previous CSI.

For example, when there is a CSI-RS previously received by the UE from a base station according to a configuration based on a control signal such as DCI or higher layer signaling, the UE may obtain compressed CSI data based on information about CSI previously obtained based on the previously received CSI-RS. For example, the UE may obtain compressed CSI data by using a temporal-attention transformer-based encoder.

According to various embodiments of the disclosure, the base station may perform reconstruction based on one or more compressed CSI data including previously obtained compressed CSI data. For example, when there are one or more previously obtained compressed CSI data in the base station because previously compressed CSI data is reported from the UE, the base station may perform reconstruction on the one or more compressed CSI data. Compressed CSI data used herein may be referred to as a feedback vector for convenience of explanation. For example, the base station may reconstruct the compressed CSI data by using a temporal-attention transformer-based decoder.

Referring to FIG. 1B, at least one of an encoder or a decoder may include one or more transformer cells. A plurality of transformer cells of the encoder may be connected through an encoder state chain. A plurality of transformer cells of the decoder may be connected through a decoder state chain.

The UE may compress information about CSI, for example, CSI data (V data), at a time t based on information about one or more previous CSI. For example, the V data at the time t may be represented as an eigenvector $V_t = [V_t^{(1)}, \ldots, V_t^{(Ns)}]$, and when $V_t$ is compressed, N previous V data $\{V_{t-N}, \ldots, V_{t-1}\}$ may be used.

For example, in a $(t-i)^{th}$ time slot, when V data ($V_{t-i}$) and an encoder state vector ($E_{t-i}$) corresponding to the $(t-i)^{th}$ time slot are input to a transformer cell of the encoder, compressed CSI data ($Z_{t-i}$ vector) and an encoder state vector ($E_{t-i+1}$) of a next time may be generated. The encoder state vector ($E_{t-i}$) may indicate a correlation between N previous CSI data. For example, the encoder state vector may indicate at least one of a feature indicating a spatial-frequency correlation or a temporal correlation feature between N previous CSI data.

The compressed CSI data ($Z_{t-i}$ vector) and the encoder state vector ($E_{t-i+1}$) of the next time may be generated by using a self-attention layer and a cross-attention layer.

In the self-attention layer, at least one of an antenna-wise correlation or a subband-wise correlation may be obtained based on the V data. For example, in the self-attention layer, at least one of an antenna-wise correlation or a subband-wise correlation may be output by performing a dot product between $V_{t-i}^{(1)}, \ldots, V_{t-i}^{(Ns)}$.

In the cross-attention layer, a new temporal feature may be obtained based on the V data ($V_{t-i}$) and the encoder state vector ($E_{t-i}$). For example, in the cross-attention layer, a dot product may be performed between the V data ($V_{t-i}$) and the encoder state vector ($E_{t-i}$) and a new temporal correlation feature may be output.

When a feature is extracted from the previous V data, the encoder state vector ($E_{t-i}$) may be processed through all previous transformer cells. For example, the previous V data $V_{t-N}, \ldots, V_{t-i-1}$ may be accumulated in the encoder state vector ($E_{t-i}$).

An output obtained from the self-attention layer and an output obtained from the cross-attention layer may be concatenated and processed through a plurality of fully-connected layers having residual connection, thereby generating the compressed CSI data ($Z_{t-i}$ vector) and the encoder state vector ($E_{t-i+}$) of the next time.

As an encoder state vector ($E_t$) is processed through N cells, compressed CSI data ($Z_t$ vector) may be generated based on the eigenvector V data ($V_t$) and the encoder state vector ($E_t$). The compressed CSI data may be transmitted from the UE to the base station.

A feature indicating a spatial-frequency correlation and a temporal correlation feature between N previous CSI data may be extracted based on the encoder state vector ($E_t$). According to an embodiment of the disclosure, the compressed CSI data ($Z_t$ vector) may indicate delta information indicating a difference between compressed CSI data ($Z_{t-N}, \ldots, Z_{t-1}$) up to a time t−1 and the compressed CSI data at the time t. According to various embodiments of the disclosure, feedback overhead of a CSI compression method according to the proposed embodiment of the disclosure may be reduced compared to spatial-frequency CSI compression.

The base station may obtain reconstructed CSI data ($\tilde{V}_t$ data) based on the one or more previously compressed CSI data ($Z_{t-N}, \ldots, Z_{t-1}$) and the compressed CSI data ($Z_t$). For example, in the $(t-i)^{th}$ time slot, when the compressed CSI data ($Z_{t-i}$) and a decoder state vector (decoder state vector, $D_{t-i}$) corresponding to the $(t-i)^{th}$ time slot are input to a transformer cell of the decoder, reconstructed CSI data ($\tilde{V}_{t-i}$ data) and a decoder state vector ($D_{t-i+1}$) of a next time may be generated.

The decoder state vector may indicate a correlation between N previously compressed CSI data ($Z_{t-N}, \ldots, Z_{t-1}$). For example, the decoder state vector may indicate at least one of a feature indicating a spatial-frequency correlation or a temporal correlation feature between N previously compressed CSI data.

The reconstructed CSI data ($\tilde{V}_{t-i}$ data) and the decoder state vector ($D_{t-i+1}$) of the next time may be generated by using a self-attention layer and a cross-attention layer.

Figure 2:
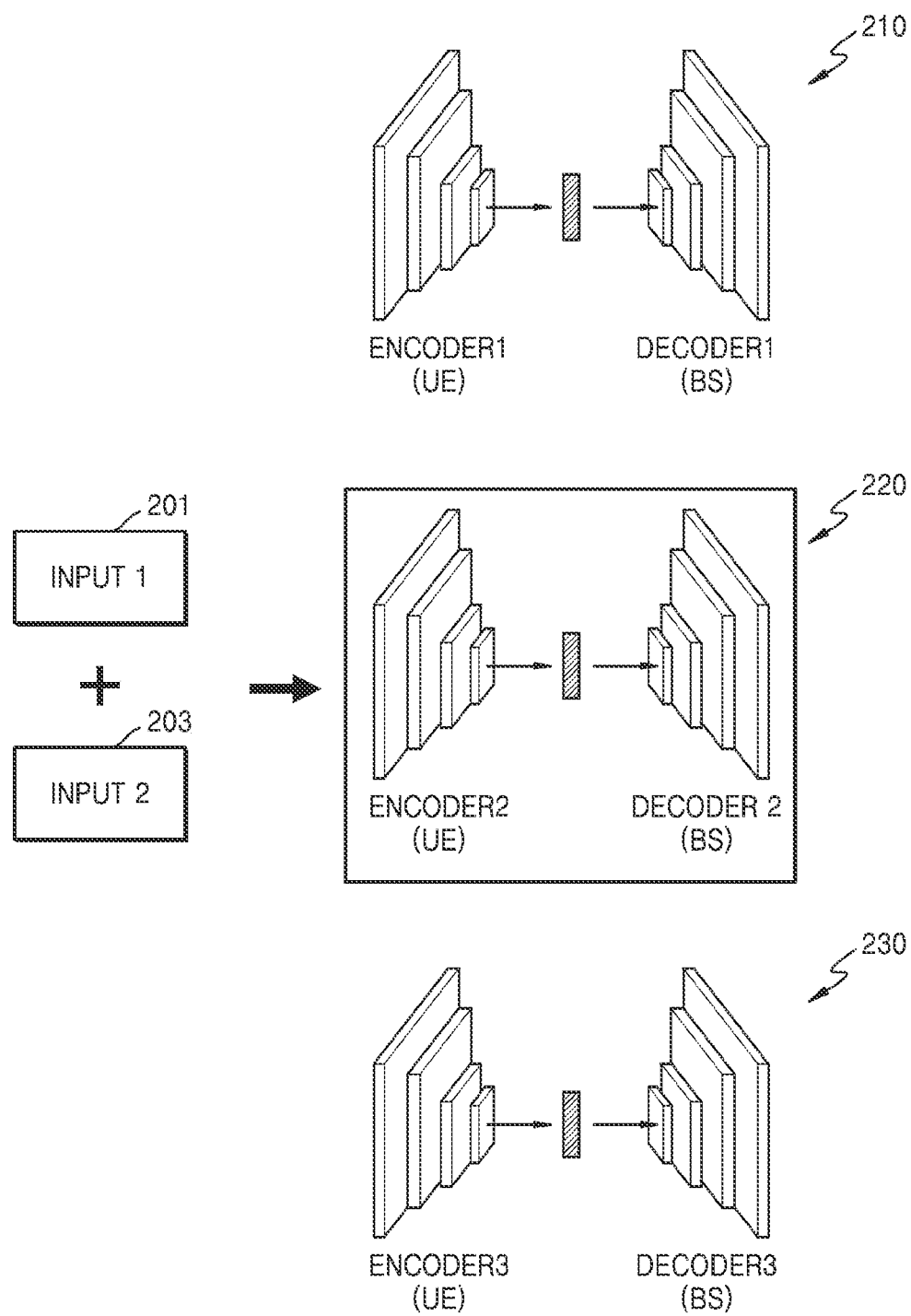
FIG. 2 illustrates a method of determining an AE, according to an embodiment.

FIG. 2 illustrates a method of determining an AE, according to an embodiment of the disclosure.

Referring to FIG. 2, a base station may determine one AE 200 from among a plurality of AEs 210, 220, and 230. The base station may determine the AE 220 for initial encoder model deployment when accessing a UE. According to an embodiment of the disclosure, the plurality of AEs may be different from each other in any one of a trained network environment, a type of a neural network (NN), a layer structure, and a layer parameter. The base station may determine an AE suitable for compression and reconstruction from among the plurality of AEs according to a network environment or capability of the UE. The type of the NN may include, for example, recurrent NN (RNN), convolutional NN (CNN), and transformer including a long short-term memory (LSTM).

FIG. 2 illustrates a method of determining an AE, according to an embodiment. Specifically, the BS may change an AE based on at least one of an input 1 (201) or an input 2 (203), while communicating with the UE. The BS may monitor a performance index for encoder model management and may determine a new AE 220 based on a monitoring result. For example, when there is degradation of a wireless communication system, for example, when a block error rate (BLER), a bit error rate (BER), or a user perceived throughput (UPT) does not satisfy a preset condition, the BS may determine the new AE 220 from among a plurality of AEs. Alternatively, when there is degradation of encoder performance, such as when channel reconstruction accuracy is less than a preset value or feedback overhead occurs, the BS may determine the new AE 220 from among the plurality of AEs. Alternatively, when there is triggering on encoder model change due to a change in a UE performance requirement such as a quality of service (QoS) requirement or an inference target latency requirement, the BS may determine the new AE 220 from among the plurality of AEs.

An input 1 (201) may include at least one of information about CSI or an SRS. The information about the CSI may include a network environment ID. An AE suitable for compression and reconstruction of CSI data may vary according to a network environment. Accordingly, a plurality of AEs 210, 220, and 230 may be trained with different network environment labels. For example, a plurality of network environment labels may be classified based on at least one of a deployment scenario, a signal-to-noise ratio (SNR) level, obstruction state information (a line of sight (LOS)/non-line of sight (NLOS) state), UE mobility information, UE position information, or indoor/outdoor state information of the UE. The deployment scenario may be used as a channel model, and examples of the deployment scenario may include an urban macrocell (UMa) scenario, an urban microcell (UMi) scenario, an indoor hotspot (InH) scenario, and a rural macrocell (RMa) scenario. The UMa scenario may be when the BS is located beneath a rooftop of a neighboring building, and the UMi scenario may be when the BS is located above the rooftop of the neighboring building.

A dataset for training an AE may vary according to each network environment, and there may be a plurality of AEs according to a dataset. For example, when there are three deployment scenarios, two indoor/outdoor states, two SNR levels, and two LOS/NLOS states, there may be 24 network environment labels. In this case, when there are three types of AI models to be applied to an AE, there may be 72 AEs.

An input 2 (203) may include information about capability of the UE or an encoder index. The information about the capability of the UE may include information about encoder capability of the UE and at least one of information about a computational complexity level of an encoder, an available memory of the UE, an allowable encoder size, or maximum power and usable power of the UE. The computational complexity level of the UE may be expressed as an index such as any one of the number of flops or a latency required for inference. For example, 1 flop may be computational operator number 1 such as an addition operation, a multiplication operation, or a convolution operation on a neural network (NN). A latency may be calculated based on the number of flops, such as by dividing the total number of flops of the encoder by the number of flops which the UE may perform for one second. an encoder model may have a higher computational complexity level as the number of flops required for inference increases and as an inference latency increases. An available memory of the UE used herein may be one in which computation is to be performed. Allowable encoder size information used herein may regard a size occupied by the encoder in a storage space. Maximum power of the UE may be indicated by a chip specification of a processor. Usable power of the UE may be a power value allocated according to power planning of the UE.

The BS may determine an appropriate AE by considering at least one of capability of a UE or an encoder suitable for a network environment, and may indicate an encoder, thereby guaranteeing AE performance.

Figure 3:
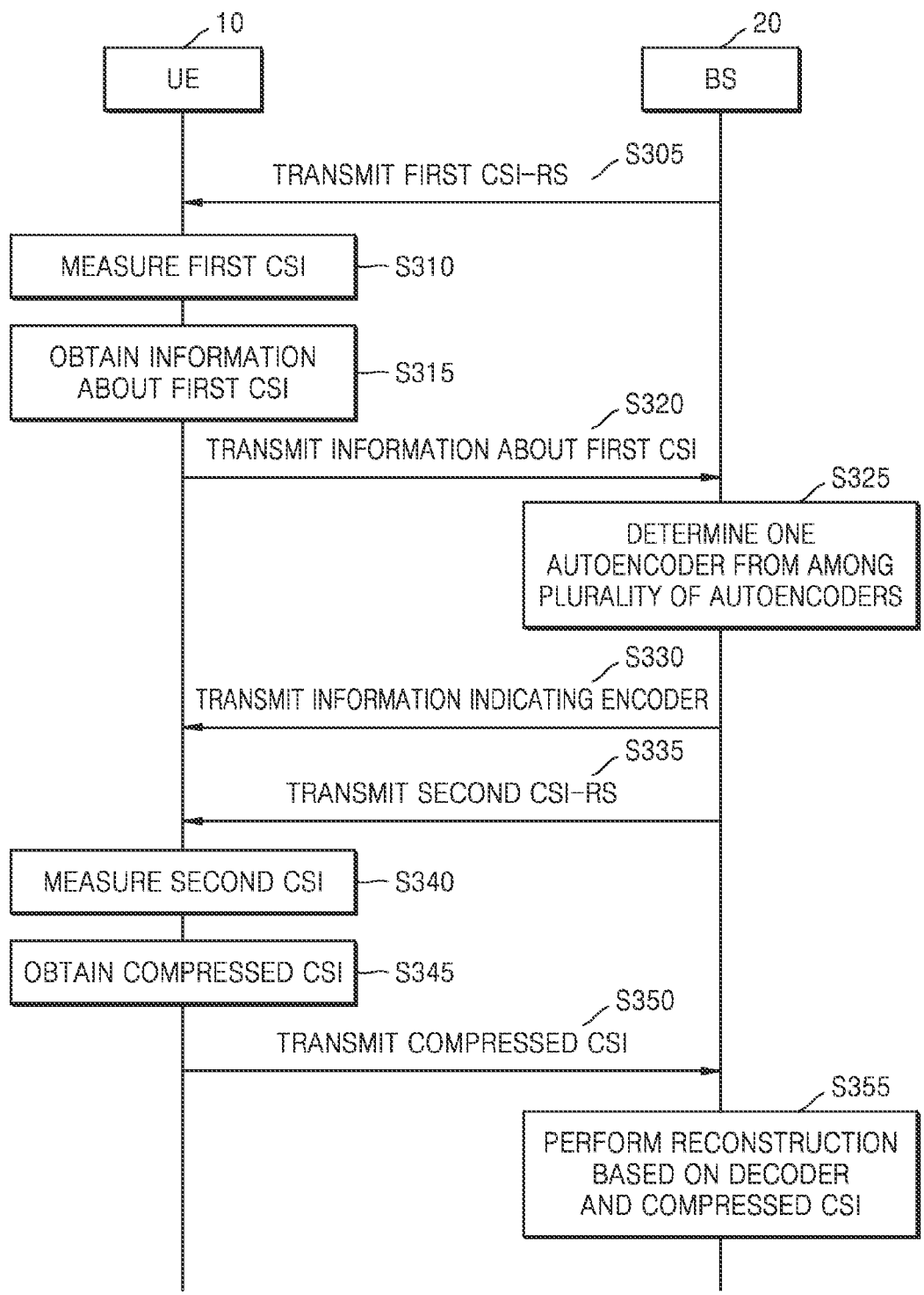
FIG. 3 is a sequence diagram for reporting CSI by using an AE determined based on information about CSI, according to an embodiment.

FIG. 3 is a sequence diagram for reporting CSI by using an AE determined based on information about CSI, according to an embodiment.

Referring to FIG. 3, a method of reporting CSI between a UE and a BS may include steps S305 to S355.

In step S305, a BS 20 may transmit a first CSI-RS to a UE 10.

In step S310, a UE 10 may measure first CSI based on the received first CSI-RS. The first CSI may include a channel $\hat{H}$ obtained by measuring a channel state.

In step S315, the UE 10 may obtain information about the first CSI. For example, the UE 10 may generate first CSI data (V data) by preprocessing the channel $\hat{H}$. The preprocessing may include EVD or SVD. Alternatively, the UE 10 may obtain a network environment ID corresponding to the first CSI, which will be described with reference to FIGS. 5 and 6.

In step S320, the UE 10 may transmit the information about the CSI to the BS 20.

In step S325, the BS 20 may determine one AE from among a plurality of AEs based on the information about the first CSI. For example, when there are the plurality of network environment labels $(E_1, \ldots, E_N)$ and the plurality of AEs $\{(A_{1,E_1}, A_{1,E_N}), (A_{2,E_1}, \ldots, A_{2,E_N}), \ldots, (A_{M,E_1}, \ldots, A_{M,E_N})\}$, the BS 20 may input the CSI data (V data) to the plurality of AEs as shown in Equation (1) below to obtain an output $O_{m,E_3}$ for each AE.

$$O_{m,E_3} = A_{m,E_3}(V), i = 1, \ldots, N \text{ (for all environments label)} \quad (1)$$

The BS 20 may determine one AE by calculating a cost function based on the information about the first CSI, such as CSI data (V data) and the output $O_{m,E_3}$ for each AE from among the plurality of AEs. The cost function may use a mean squared error (MSE) as shown in Equation (2) below or a cosine similarity (CS) as shown in Equation (3) below. For example, when an AE is determined based on an MSE, the BS 20 may determine an AE having a smallest MSE from among the plurality of AEs. Alternatively, when an AE is determined based on a CS, the BS 20 may determine an AE having a largest CS from among the plurality of AEs.

$$MSE(m, E_i) = \quad (2)$$
$$\|V - O_{m,E_i}\|_F \ (i = 1, \cdots, N), A_{m,E_i^*} = \arg\min_i MSE(m, E_i)$$

$$CS(m, E_i) = |\langle V, O_{m,E_i} \rangle| \ (i = 1, \cdots, N), A_{m,E_i^*} = \arg\max_i CS(m, E_i), \quad (3)$$

In step S330, the BS 20 may transmit information indicating an encoder included in the determined AE to the UE 10. For example, the information indicating the encoder may include at least one of information about an NN structure of the encoder or information about a weight of the trained encoder. The information about the NN structure of the encoder may include at least one of information about a type of an NN, information about the number of hidden layers, or information about a width (dimension) of each hidden layer. Alternatively, the information indicating the encoder may include at least one of index information of a dataset or information about a weight of the trained encoder. For example, the dataset of the encoder AI model may include at least one of an index, information about a type of an NN usable as the encoder, information about the number of parameters of the NN, information about the number of flops, information about an inference latency, or a CS. For example, the dataset of the encoder AI model may be formed as shown below in Table 1.

TABLE 1

| Index | Type of NN | Num. parameters | Num. FLOPs | Inference latency | Cosine similarity |
|---|---|---|---|---|---|
| 1 | Convolutional NN (CNN) | $8 \times 10^4$ | $8 \times 10^5$ | 50 μs | 0.88 |
| 2 | Long short-term memory (LSTM) | $7 \times 10^5$ | $2 \times 10^7$ | 150 μs | 0.93 |
| 3 | Transformer | $9 \times 10^5$ | $5 \times 10^6$ | 100 μs | 0.91 |

In step S335, the BS 20 may transmit a second CSI-RS.

In step S340, the UE 10 may measure second CSI based on the second CSI-RS and generate information about the second CSI by preprocessing the second CSI.

In step S345, the UE 10 may obtain compressed CSI based on the indicated encoder and the information about the second CSI. For example, the UE 10 may input the information about the second CSI, for example, second CSI data, to the encoder and may output the compressed CSI.

In step S350, the UE 10 may transmit the compressed CSI to the BS 20.

In step S355, the BS 20 may perform reconstruction based on the compressed CSI and a decoder included in the determined one AE. For example, the BS may perform reconstruction by inputting the decoder included in the AE determined based on the compressed CSI. The BS may obtain information about CSI through reconstruction.

Figure 4:
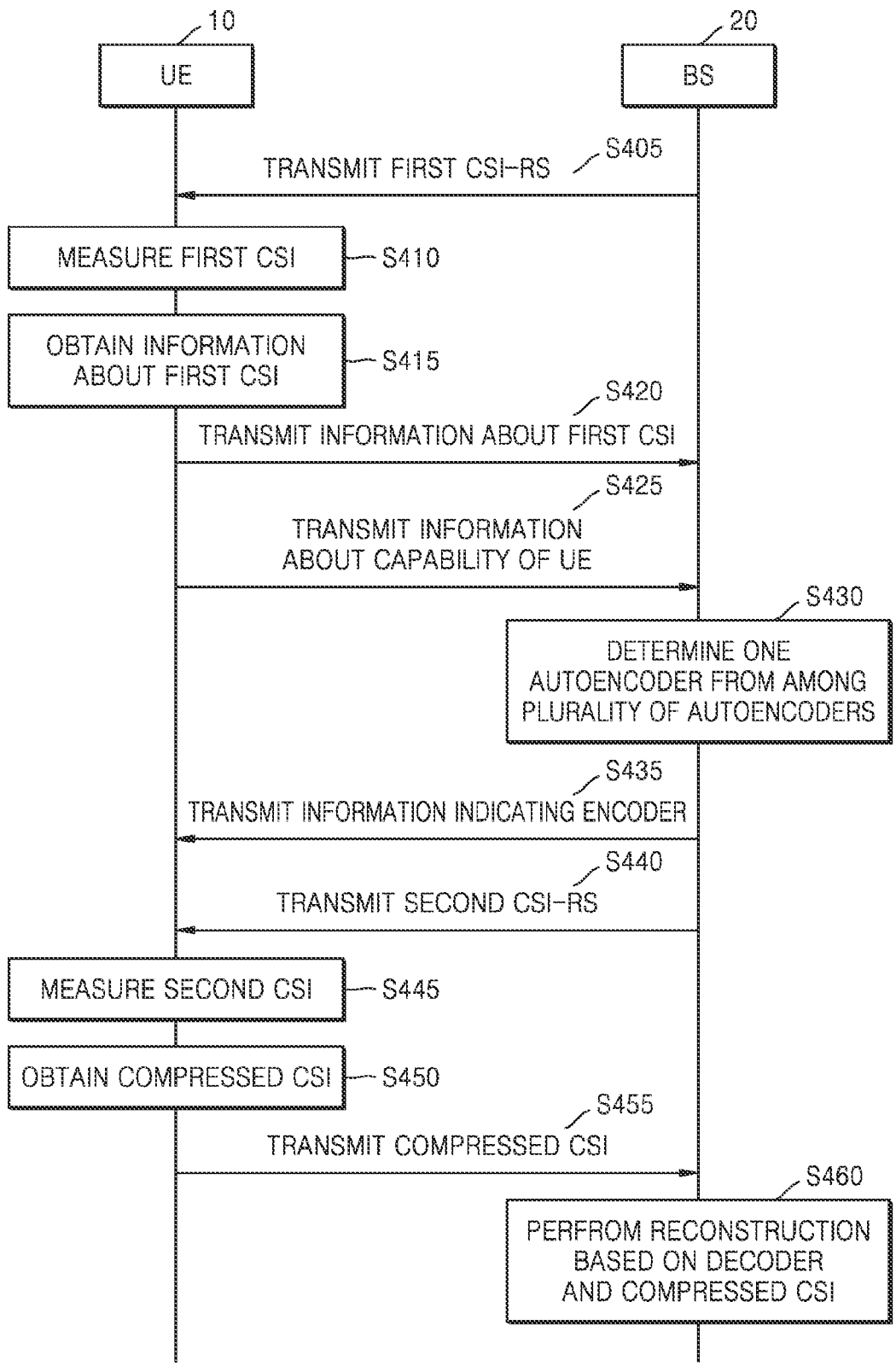
FIG. 4 is a sequence diagram for reporting CSI by using an AE determined based on information about capability of a UE and information about CSI, according to an embodiment.

FIG. 4 is a sequence diagram for reporting CSI by using an AE determined based on information about capability of a UE and information about CSI, according to an embodiment.

In step S405, the BS 20 may transmit a first CSI-RS to the UE 10.

In step S410, the UE 10 may measure the first CSI based on the received first CSI-RS. The first CSI may include a channel H obtained by measuring a channel state.

In step S415, the UE 10 may obtain information about the first CSI.

In step S420, the UE 10 may transmit the information about the first CSI to the BS.

In step S425, the UE 10 may transmit information about capability of the UE to the BS. The information about the capability of the UE may include at least one of information about a computational complexity level of an encoder, information about an available memory of the UE, information about an allowable encoder size, or information about maximum power and usable power of the UE.

The computational complexity level of the encoder may be expressed as an index such as any one of the number of flops or a latency required for inference. Herein, an encoder of high-level complexity may have a larger number of flops or a larger latency than an encoder of middle-level complexity. 1 flop may be computational operator number 1 such as an addition operation, a multiplication operation, or a convolution operation on an NN. A latency may be calculated based on the number of flops by dividing the total number of flops of the encoder by the number of flops which the UE may perform in one second.

In step S430, the BS may determine one AE from among a plurality of AEs based on the information about the capability of the UE and the information about the first CSI.

The BS may determine one or more AE candidates from among the plurality of AEs based on the information about the capability of the UE. The BS may determine one AE from among the one or more AE candidates determined based on the information about the first CSI.

The BS may determine one or more AEs based on the information about the capability of the UE, such as a complexity level of the UE included in the information about the capability of the UE. For example, when there are encoders of high-level complexity, middle-level complexity, and low-level complexity and the UE reports to the BS that middle-level complexity is possible. The BS may then determine an AE from among AEs including the encoder of middle-level complexity or AEs including the encoder of low-level complexity.

Alternatively, the BS may determine an AE based on an available memory of the UE included in the information about the capability of the UE. For example, the BS may determine an AE including an encoder requiring less memory space during computation than the available memory of the UE.

Alternatively, the BS may determine an AE based on information about an allowable encoder size of the UE included in the information about the capability of the UE. For example, the BS may determine an AE from among AEs including an encoder that is smaller than the allowable encoder size.

Alternatively, the BS may determine an AE based on maximum power and usable power of the UE included in the information about the capability of the UE. The BS may determine an AE from among AEs including an encoder whose power consumption is less than or equal to the maximum power or the usable power of the UE. The BS may calculate power consumption based on at least one of information about the number of flops of the UE or the number of parameters of an AI model.

When an AE is determined for encoder model management, the BS may determine an AE from among one or more existing AE candidates. Because the BS identifies the capability of the UE, a method of determining one or more AE candidates based on the information about the capability of the UE may be omitted.

In step S435, the BS 20 may transmit information indicating an encoder included in the determined AE to the UE 10.

In step S440, the BS 20 may transmit a second CSI-RS.

In step S445, the UE 10 may measure second CSI based on the second CSI-RS and may generate information about the second CSI by preprocessing the second CSI.

In step S450, the UE 10 may obtain compressed CSI based on the indicated encoder and the information about the second CSI. For example, the UE 10 may input the second CSI data to the encoder, and may output the compressed CSI.

In step S455, the UE 10 may transmit the compressed CSI to the BS 20.

In step S460, the BS 20 may perform reconstruction based on the compressed CSI and a decoder included in the determined one AE.

Figure 5:
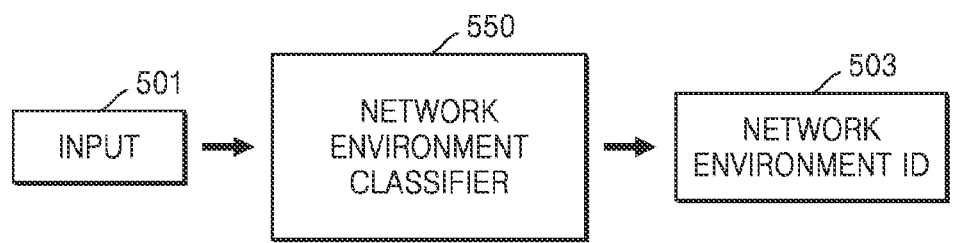
FIG. 5 illustrates a process of obtaining a network environment identification (ID) by using a network environment classifier, according to an embodiment.

FIG. 5 illustrates a process of obtaining a network environment ID by using a network environment classifier, according to an embodiment.

Referring to FIG. 5, a UE or a BS may identify a network environment ID 503 by using a network environment classifier 550.

An input 501 may be information about CSI, such as CSI data (V data). The input 501 may be a received CSI-RS or DL-positioning reference signal (PRS). When the input 501 is a DL-PRS, DL positioning information such as at least one of DL-time difference of arrival (TDOA), DL-angle of departure (AoD), or DL-reference signal received power (RSRP), may also be input. The input 501 may be an SRS, in which case positioning information of the UE, such as at least one of UL-angle of arrival (AoA), UL-RSRP, or UL-relative time of arrival (RTOA), may also be input.

A plurality of network environment labels may be classified based on at least one of a deployment scenario, an SNR level, obstruction state information (an LOS/NLOS state), UE mobility information, UE position information, or indoor/outdoor state information of the UE. For example, the deployment scenario may be used as a channel model, and examples of the deployment scenario may include a UMa scenario, a UMi scenario, an InH scenario, and an RMa scenario. For example, the UMa scenario may be when the BS is located beneath a rooftop of a neighboring building, and the UMi scenario may be when the BS is located above a rooftop of a neighboring building.

The network environment ID 503 indicating one network label corresponding to a network environment of the input 501 may be obtained by using the network environment classifier 550 based on the input 501. For example, when network environment labels each including a deployment scenario and indoor/outdoor state information are 1: UMa+outdoor, 2: UMa+indoor, 3: UMi+outdoor, 4: UMi+indoor, and 5: InH+indoor and the UE inputs CSI data (V data) corresponding to UMi+outdoor to the network environment classifier 550, the network environment ID 503 corresponding to an output of the network environment classifier 550 is 3. Alternatively, when network environment labels each including a deployment scenario and a movement speed of the UE are 1: UMa+3 kilometers per hour (km/h), 2: UMa+30 km/h, 3: UMi+3 km/h, and 4: UMi+30 km/h and the UE inputs CSI data (V data) corresponding to UMa+3 km/h to the network environment classifier 550, the network environment ID 503 corresponding to an output of the network environment classifier 550 is 1. Overhead when a network environment ID is transmitted may be less than overhead when CSI data (V data) is transmitted.

An AI model trained to output a network environment ID or a network environment label based on the input 501 through the network environment classifier 550 may be used. The AI model may include at least one layer, and each layer may include at least one weight set to a preset initial value. The AI model may be trained by changing a value of the weight by using input data and target data. For example, a value of the at least one weight included in the at least one layer may be changed so that a network environment ID obtained as a result of inputting CSI data (V data) to the AI model becomes similar to a network environment ID of a target network environment label.

Figure 6:
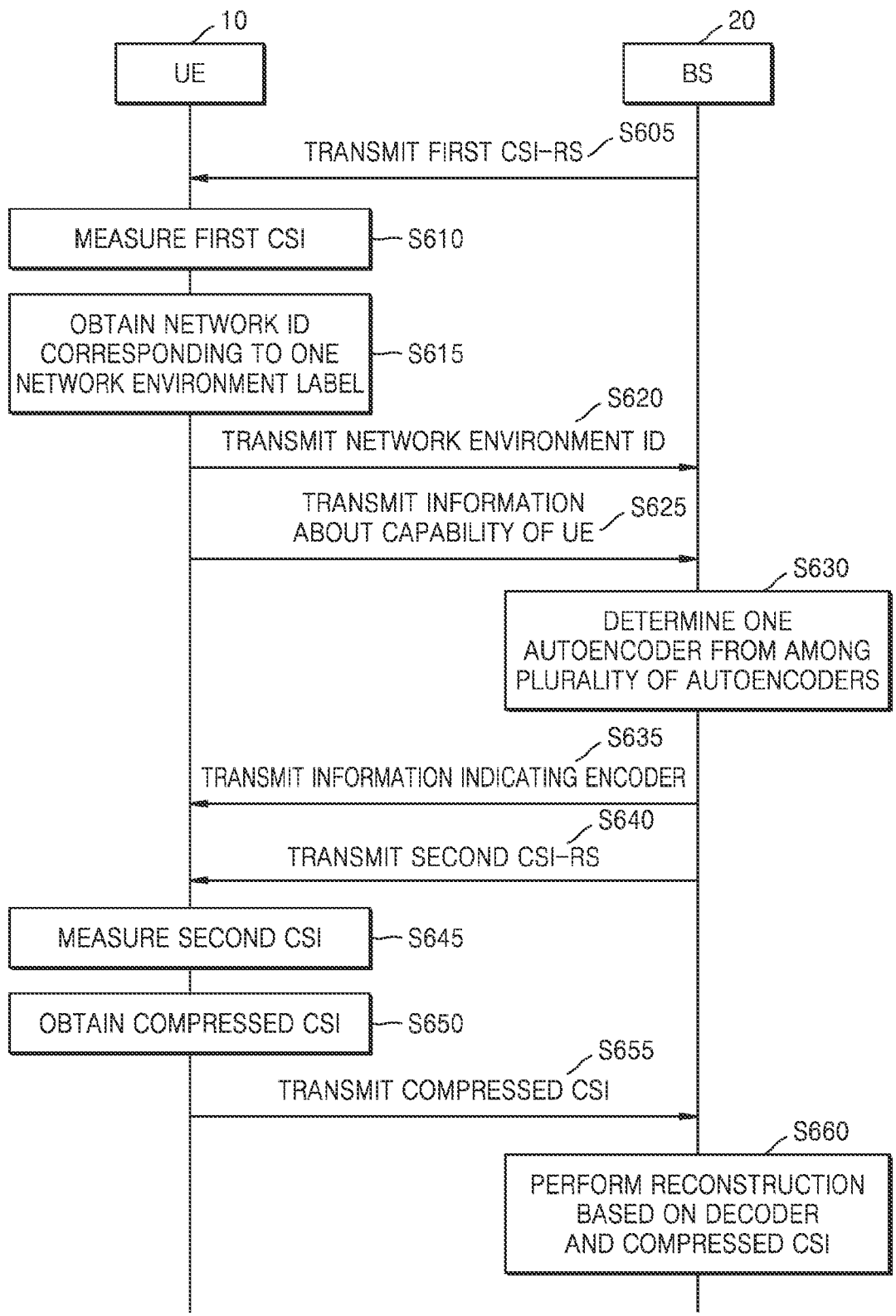
FIG. 6 is a sequence diagram for reporting CSI by using an AE determined based on information about capability of a UE and a network environment ID, according to an embodiment.

FIG. 6 is a sequence diagram for reporting CSI by using an AE determined based on information about capability of a UE and a network environment ID, according to an embodiment.

In step S605, the BS 20 may transmit a first CSI-RS to the UE.

In step S610, the UE 10 may measure first CSI based on the received first CSI-RS. The first CSI may include a channel H obtained by measuring a channel state.

In step S615, the UE 10 may obtain a network environment ID indicating one network environment label corresponding to the first CSI from among a plurality of network environment labels. The network environment ID may be obtained by using a network environment classifier. For example, CSI data (V data) may be used as the input 501 of the network environment classifier 550. The UE may obtain a network environment ID output as a result of inputting first CSI data (V data) to the network environment classifier, and the network environment ID may indicate one network environment label corresponding to the first CSI data. An AI model trained to output a network environment ID based on CSI data in the network environment classifier may be used.

Alternatively, the first CSI-RS may be used as the input 501 of the network environment classifier 550. The UE may obtain a network environment ID output as a result of inputting the first CSI-RS to the network environment classifier, and the network environment ID may indicate one network environment label corresponding to the first CSI-RS. An AI model trained to output a network environment ID based on a CSI-RS in the network environment classifier may be used.

Alternatively, a DL-PRS may be used as an input of the network environment classifier. DL positioning information (DL-TDOA, DL-AoD, or DL-RSRP) obtained from the DL-PRS may also be used as an input of the network environment classifier. The UE may obtain a network environment ID output as a result of inputting the DL-PRS to the network environment classifier, and the network environment ID may indicate one network environment label corresponding to the DL-PRS. An AI model trained to output a network environment ID based on a DL-RRS in the network environment classifier may be used.

In step S620, the UE 10 may transmit the network environment ID included in the information about the first CSI to the BS 20. The network environment ID may indicate one network environment label corresponding to the first CSI from among a plurality of network environment labels that are pre-classified.

In step S625, the UE 10 may transmit information about capability of the UE to the BS.

In step S630, the BS 20 may determine one AE from among a plurality of AEs based on the information about the capability of the UE and the network environment ID included in the information about the first CSI. For example, the BS may determine one or more AE candidates usable by the UE from among the plurality of AEs based on the information about the capability of the UE, and may determine one AE based on a network environment ID from among the determined AE candidates. Alternatively, the BS may determine one or more AE candidates suitable for a network environment of the UE from among the plurality of AEs based on the network environment ID, and may determine one AE based on the information about the capability of the UE from among the determined AE candidates. For example, the BS may determine an AE based on the information about the capability of the UE, and may determine an AE from among AEs trained with a dataset corresponding to a network environment label indicated by the network environment ID.

In step S635, the BS 20 may transmit information indicating an encoder included in the determined AE to the UE 10.

In step S640, the BS 20 may transmit a second CSI-RS to the UE 10.

In step S645, the UE 10 may measure second CSI based on the second CSI-RS and may generate information about the second CSI by preprocessing the second CSI.

In step S650, the UE 10 may obtain compressed CSI based on the indicated encoder and the information about the second CSI. For example, the UE 10 may input second CSI data to the encoder and may output the compressed CSI.

In step S655, the UE 10 may transmit the compressed CSI to the BS 20.

In step S660, the BS 20 may perform reconstruction based on the compressed CSI and a decoder included in the determined AE.

Figure 7:
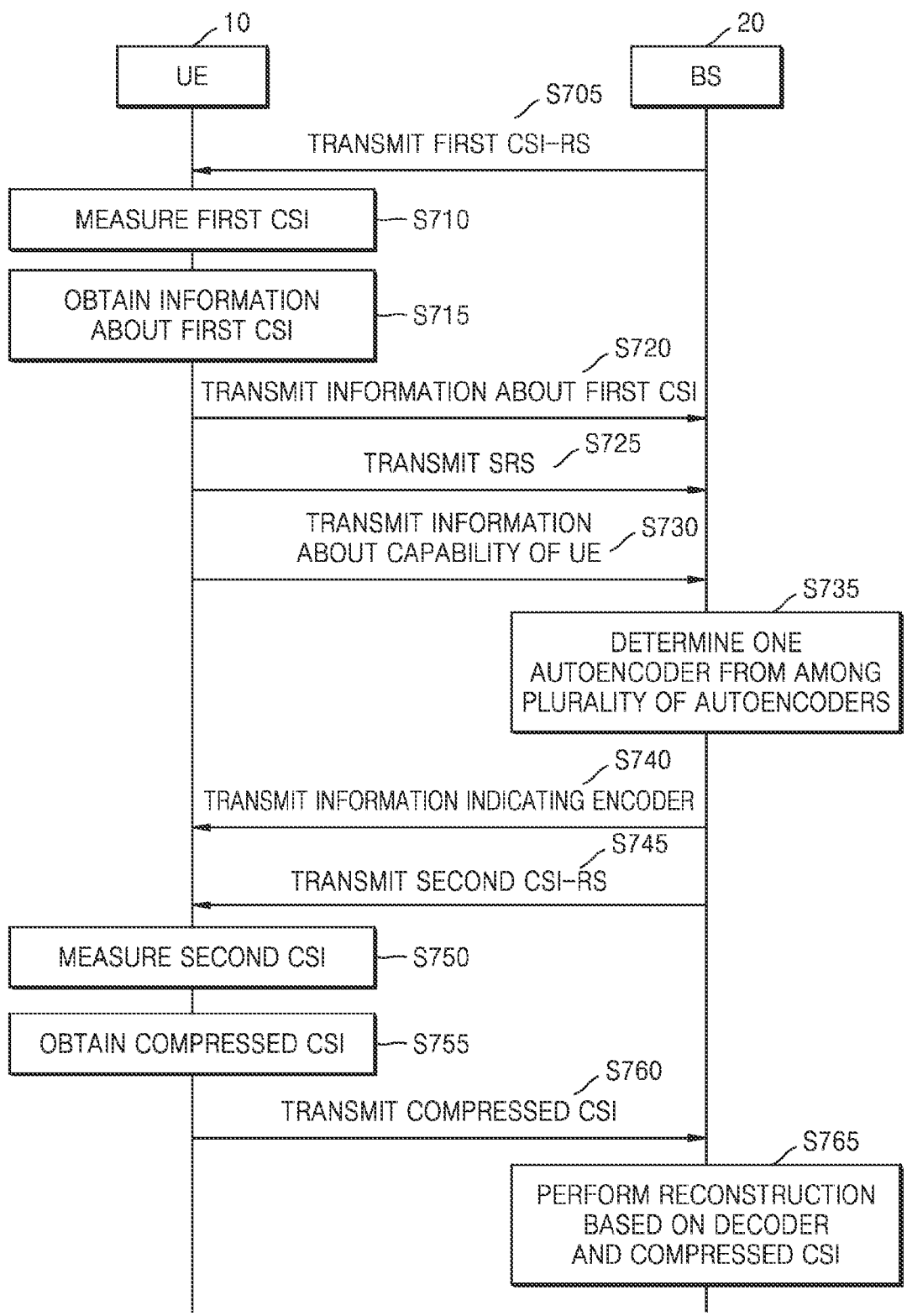
FIG. 7 is a sequence diagram for reporting CSI by using an AE determined based on information about capability of a UE and a sounding reference signal (SRS), according to an embodiment.

FIG. 7 is a sequence diagram for reporting CSI by using an AE determined based on information about capability of a UE and an SRS, according to an embodiment.

In step S705, the BS 20 may transmit a first CSI-RS to the UE 10.

In step S710, the UE 10 may measure CSI based on the received first CSI-RS. The CSI may include a channel H obtained by measuring a channel state.

In step S715, the UE may obtain information about the first CSI, in the manner of step S315 of FIG. 3.

In step S720, the UE 10 may transmit the information about the CSI to the BS 20.

In step S725, the UE 10 may transmit an SRS to the BS 20.

In step S730, the UE 10 may transmit information about capability of the UE to the BS 20.

In step S735, the BS 20 may determine one AE from among a plurality of AEs based on the information about the capability of the UE and the SRS. The network environment ID 503 output by using the SRS as the input 501 of the network environment classifier 550 may be obtained, and one AE may be determined from among the plurality of AEs based on the information about the capability of the UE and the network environment ID. The network environment ID may indicate one network environment label corresponding to the SRS. An AI model trained to output a network environment ID based on an SRS in the network environment classifier may be used. A method of determining one AE from among the plurality of AEs based on the information about the capability of the UE and the network environment ID may be performed with reference to step S630 of FIG. 6.

The BS may determine one or more AE candidates usable by the UE from among the plurality of AEs based on the information about the capability of the UE, and may determine one AE based on UL channel related information obtained based on the SRS. For example, the UL channel related information may include any one of channels $H_{UL}$ and $V_{UL}$. The BS may determine one AE by using a cost function between the $V_{UL}$ and reconstructed data $\widehat{V_{UL}}$. For example, the BS may determine an AE having a smallest MSE($V_{UL}$, $\widehat{V_{UL}}$) or an AE having a largest CS($V_{UL}$, $\widehat{V_{UL}}$).

In step S740, the BS 20 may transmit information indicating an encoder included in the determined AE to the UE 10.

In step S745, the BS 20 may transmit a second CSI-RS.

In step S750, the UE 10 may measure second CSI based on the second CSI-RS. The UE 10 may obtain information about the second CSI by preprocessing the second CSI.

In step S755, the UE 10 may obtain compressed CSI based on the indicated encoder and the information about the second CSI. For example, the UE 10 may input the information about the second CSI, for example, second CSI data, to the encoder, and may output the compressed CSI.

In step S760, the UE 10 may transmit the compressed CSI to the BS 20.

In step S765, the BS 20 may perform reconstruction based on the compressed CSI and a decoder included in the determined AE.

Figure 8:
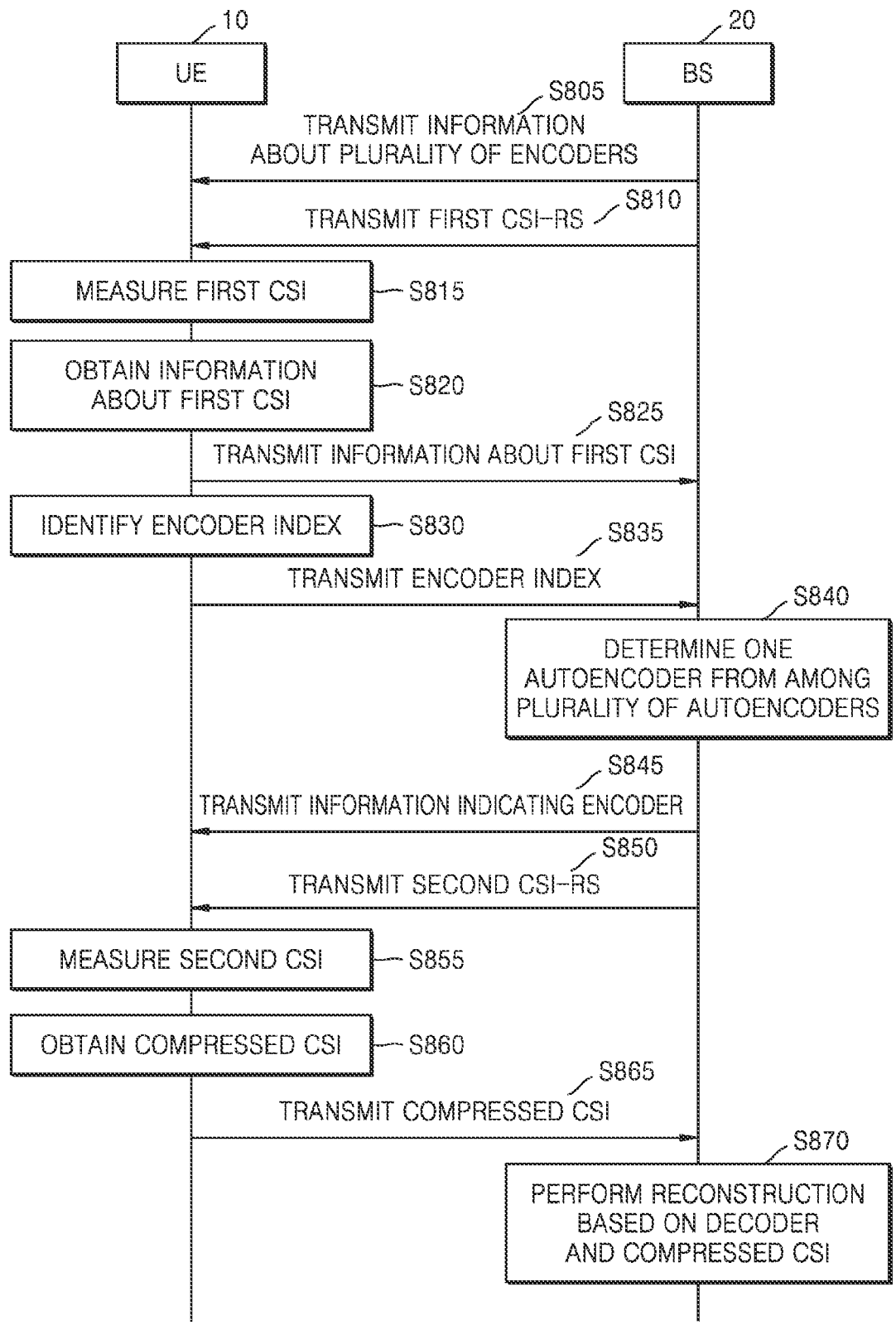
FIG. 8 is a sequence diagram for reporting CSI by using an AE determined based on an encoder index and information about CSI, according to an embodiment.

FIG. 8 is a sequence diagram for reporting CSI by using an AE determined based on an encoder index and information about CSI, according to an embodiment.

In step S805, the BS 20 may transmit information about a plurality of encoders. The information about the plurality of encoders may include information about a type or structure of an NN. For example, the information about the plurality of encoders may include information such as 1: CNN structure, 2: LSTM structure, and 3: transformer structure. The information about the plurality of encoders may be transmitted in a unicast or broadcast manner. When the plurality of encoders are indicated cell-specifically, the information may be transmitted in a broadcast manner, and a broadcast manner may have less overhead than a unicast manner.

In step S810, the BS 20 may transmit a first CSI-RS to the UE 10.

In step S815, the UE 10 may measure first CSI based on the received first CSI-RS. The first CSI may include a channel H obtained by measuring a channel state.

In step S820, the UE 10 may obtain information about the first CSI, in the manner of step S315 of FIG. 3.

In step S825, the UE 10 may transmit the information about the first CSI to the BS 20.

In step S830, the UE 10 may identify an encoder index based on the information about the plurality of encoders and information about capability of the UE. The UE may determine an encoder based on the information about the plurality of encoders and the information about the capability of the UE. The UE 10 may identify an encoder index corresponding to the determined encoder. A method of transmitting the encoder index may have less overhead than a method of transmitting the information about the capability of the UE.

In step S835, the UE 10 may transmit the identified encoder index to the BS 20.

In step S840, the BS 20 may determine one AE from among a plurality of AEs based on the encoder index and the information about the first CSI. The BS may determine one or more AE candidates from among the plurality of AEs based on the received encoder index. For example, the BS may determine AEs including an encoder corresponding to the encoder index as AE candidates. The BS may determine one AE from among the one or more AE candidates based on the information about the first CSI.

In step S845, the BS 20 may transmit information indicating an encoder included in the determined AE to the UE 10.

In step S850, the BS 20 may transmit a second CSI-RS to the UE 10.

In step S855, the UE 10 may measure second CSI based on the second CSI-RS and may generate information about the second CSI by preprocessing the second CSI.

In step S860, the UE 10 may obtain compressed CSI based on the indicated encoder and the information about the second CSI. For example, the UE 10 may input second CSI data to the encoder, and may output the compressed CSI.

In step S865, the UE 10 may transmit the compressed CSI to the BS 20.

In step S870, the BS 20 may perform reconstruction based on the compressed CSI and a decoder included in the determined one AE.

Figure 9:
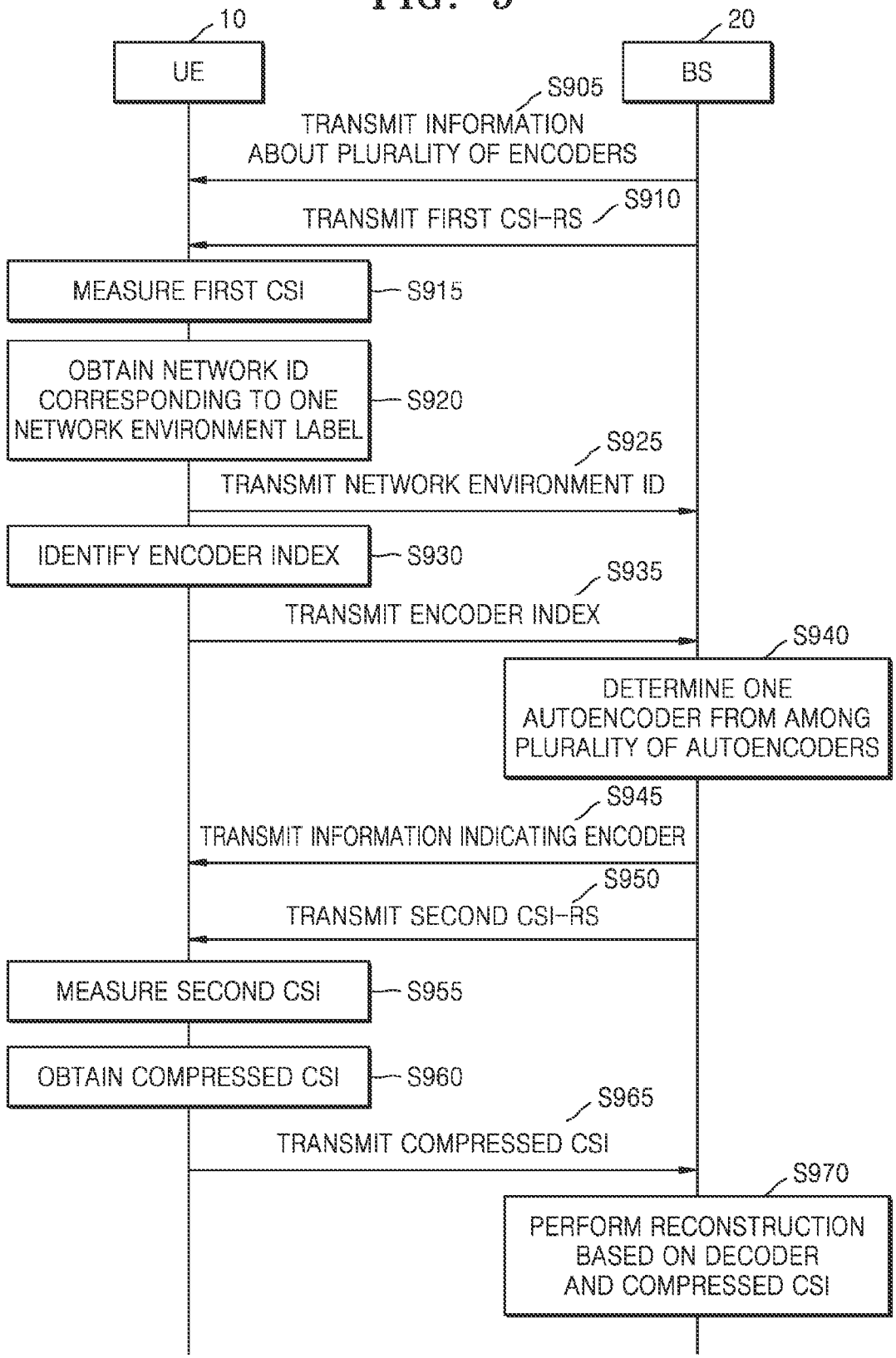
FIG. 9 is a sequence diagram for reporting CSI by using an AE based on an encoder index and a network environment ID, according to an embodiment.

FIG. 9 is a sequence diagram for reporting CSI by using an AE based on an encoder index and a network environment ID, according to an embodiment.

In step S905, the BS 20 may transmit information about a plurality of encoders to the UE 10.

In step S910, the BS 20 may transmit a first CSI-RS to the UE 10.

In step S915, the UE 10 may measure first CSI based on the received first CSI-RS. The first CSI may include a channel H obtained by measuring a channel state.

In step S920, the UE 10 may obtain a network environment ID indicating one network environment label corresponding to the first CSI from among a plurality of network environment labels.

In step S925, the UE 10 may transmit the network environment ID to the BS 20.

In step S930, the UE 10 may identify an encoder index based on the information about the plurality of encoders and information about capability of the UE.

In step S935, the UE 10 may transmit the identified encoder index to the BS 20.

In step S940, the BS may determine one AE from among a plurality of AEs based on the network environment ID and the received encoder index, and the BS may determine one AE from among the one or more AE candidates based on the network environment ID. For example, the BS may determine AEs including an encoder corresponding to the encoder index as AE candidates and may determine an AE trained in a network environment label indicated by the network ID from among the AE candidates. The BS may determine one or more AE candidates from among the plurality of AEs based on the network environment ID and may determine one AE from among the one or more AE candidates based on the encoder index.

In step S945, the BS 20 may transmit information indicating an encoder included in the determined AE to the UE 10.

In step S950, the BS 20 may transmit a second CSI-RS to the UE 10.

In step S955, the UE 10 may measure second CSI based on the second CSI-RS and may generate information about the second CSI by preprocessing the second CSI.

In step S960, the UE 10 may obtain compressed CSI based on the indicated encoder and the information about the second CSI. For example, the UE 10 may input the information about the second CSI, for example, second CSI data, to the encoder, and may output the compressed CSI.

In step S965, the UE 10 may transmit the compressed CSI to the BS 20.

In step S970, the BS 20 may perform reconstruction based on the compressed CSI and a decoder included in the determined one AE.

Figure 10:
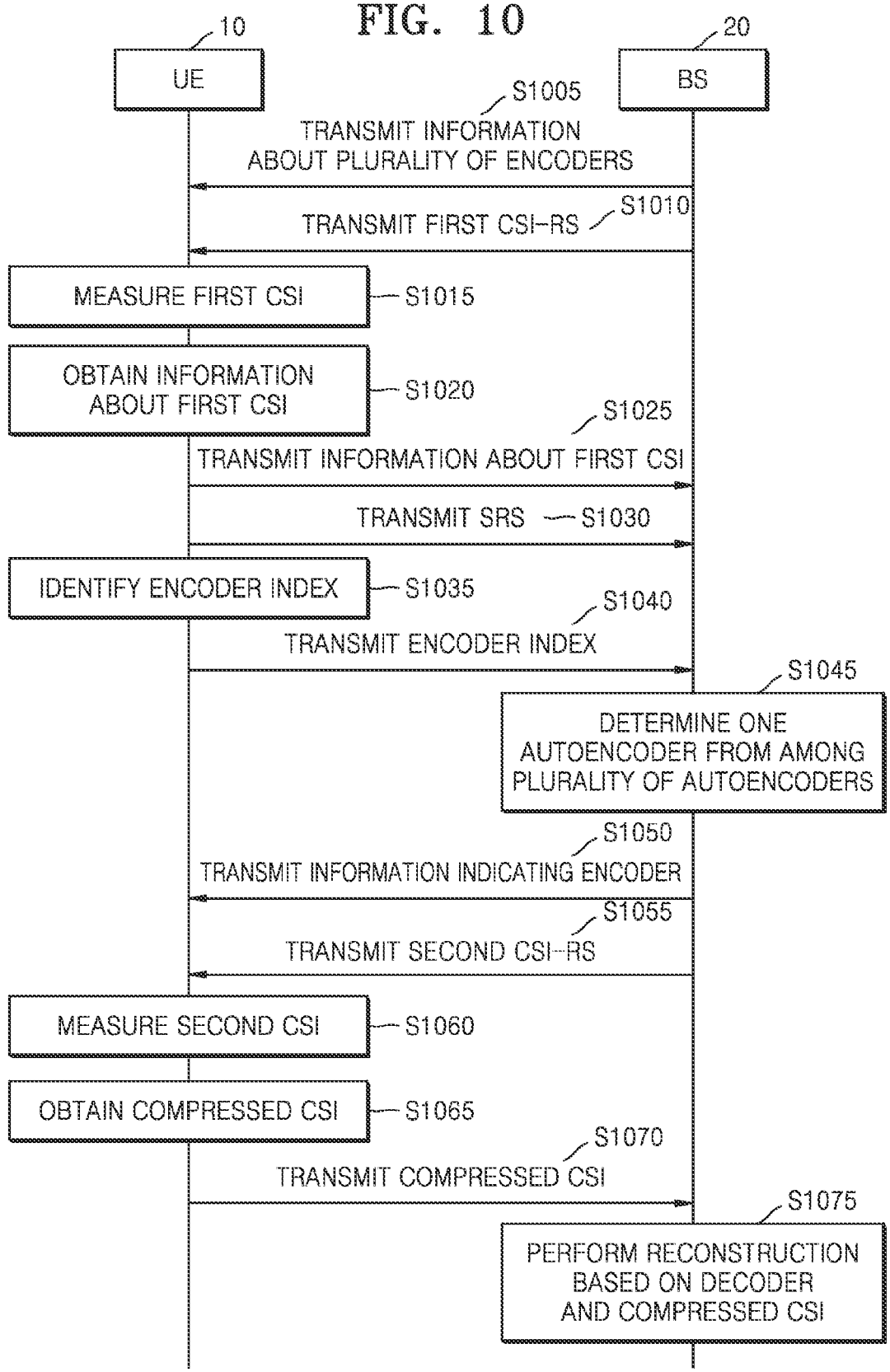
FIG. 10 is a sequence diagram for reporting CSI by using an AE determined based on an encoder index and an SRS, according to an embodiment.

FIG. 10 is a sequence diagram for reporting CSI by using an AE determined based on an encoder index and an SRS, according to an embodiment.

In step S1005, the BS 20 may transmit information about a plurality of encoders to the UE 10.

In step S1010, the BS 20 may transmit a first CSI-RS to the UE 10.

In step S1015, the UE 10 may measure first CSI based on the received first CSI-RS. The first CSI may include a channel H obtained by measuring a channel state.

In step S1020, the UE 10 may obtain information about the first CSI.

In step S1025, the UE 10 may transmit the information about the first CSI to the BS 20.

In step S1030, the UE 10 may transmit an SRS to the BS 20.

In step S1035, the UE 10 may identify an encoder index based on the information about the plurality of encoders and information about capability of the UE 10.

In step S1040, the UE 10 may transmit the identified encoder index to the BS 20.

In step S1045, the BS 20 may determine one AE from among a plurality of AEs based on the SRS and the encoder index. The BS 20 may determine one or more AE candidates from among the plurality of AEs based on the received encoder index. For example, the BS 20 may determine AEs including an encoder corresponding to the encoder index as AE candidates and may determine one AE from among the one or more AE candidates based on the SRS.

In step S1050, the BS 20 may transmit information indicating an encoder included in the determined AE to the UE 10.

In step S1055, the BS 20 may transmit a second CSI-RS to the UE 10.

In step S1060, the UE 10 may measure second CSI based on the second CSI-RS and may generate information about the second CSI by preprocessing the second CSI.

In step S1065, the UE 10 may obtain compressed CSI based on the indicated encoder and the information about the second CSI. For example, the UE 10 may input the second CSI data, to the encoder, and may output the compressed CSI.

In step S1070, the UE 10 may transmit the compressed CSI to the BS 20.

In step S1075, the BS 20 may perform reconstruction based on the compressed CSI and a decoder included in the determined AE.

Figure 11:
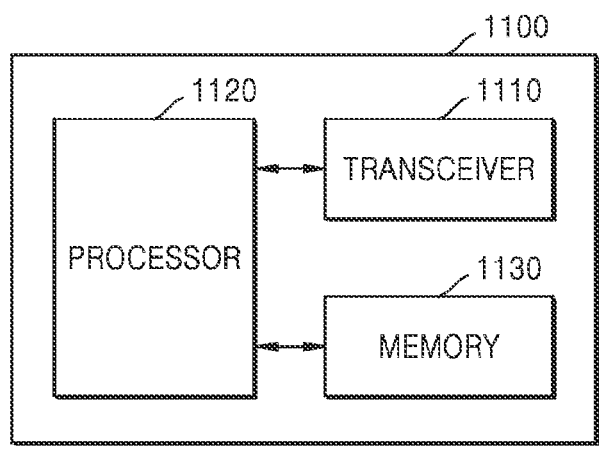
FIG. 11 illustrates a structure of a BS, according to an embodiment.

FIG. 11 illustrates a structure of a BS 1100, according to an embodiment.

Referring to FIG. 10, the BS 1100 may include a transceiver 1110, a processor 1120, and a memory 1130, which may collectively operate according to a communication method of the BS 1100. However, elements of the BS 1100 are not limited thereto. For example, the BS 1100 may include more or fewer elements than those described above. The transceiver 1110, the processor 1120, and the memory 1130 may be implemented as a single chip and the processor 1120 may include one or more processors.

A receiver and a transmitter of the BS 1100 are collectively referred to as the transceiver 1110, which may transmit or receive signals (i.e., control information and data) to or from a UE or a network entity. To this end, the transceiver 1110 may include an RF transmitter for up-converting and amplifying a frequency of a transmitted signal, and an RF receiver for low-noise amplifying and down-converting a frequency of a received signal. However, this is merely an example of the transceiver 1110, and elements of the transceiver 1110 are not limited to the RF transmitter and the RF receiver.

The transceiver 1110 may perform functions for transmitting and receiving signals via a wireless channel. For example, the transceiver 1110 may receive signals through wireless channels and output the signals to the processor 1120, and may transmit signals output from the processor 1120 through wireless channels.

The memory 1130 may store a program and data required to operate the BS 1100 and may store control information or data included in a signal obtained by the BS. The memory 1130 may include a storage medium such as a read-only memory (ROM), a random-access memory (RAM), a hard disk, a compact disc (CD)-ROM, or a digital versatile disc (DVD), or a combination thereof. The memory 1130 may not be separately provided but may be included in the processor 1120. The memory 1130 may include a volatile memory, a non-volatile memory, or a combination of a volatile memory and a non-volatile memory, and may provide stored data according to a request of the processor 1120.

The processor 1120 may control a series of processes so that the BS 1100 operates according to an embodiment. For example, the processor 1120 may receive a control signal and a data signal through the transceiver 1110 and process the received control signal and data signal. The processor 1120 may transmit the processed control signal and data signal through the transceiver 1110, may write data to and read data from the memory 1130, and may perform functions of a protocol stack required by communication standards. To this end, the processor 1120 may include at least one processor or microprocessor. A part of the transceiver 1110 or the processor 1120 may be referred to as a communication processor (CP).

The processor 1120 may include one or more processors such as a central processing unit (CPU), an application processor (AP), a digital signal processor (DSP), a graphics processor such as a graphics processing unit (GPU) or a vision processing unit (VPU), or an AI processor such as a neural processing unit (NPU). For example, when the one or more processors are AI processors, they may be designed as a hardware structure specialized in processing a particular AI model.

The processor 1120 may receive, from a UE, information about first CSI measured based on a first CSI-RS, determine one AE from among a plurality of AEs based on the information about the first CSI, transmit, to the UE, information indicating an encoder included in the determined AE, transmit a second CSI-RS to the UE, receive CSI compressed based on information about second CSI based on the second CSI-RS and the indicated encoder, and perform reconstruction based on the compressed CSI and a decoder included in the determined AE.

Figure 12:
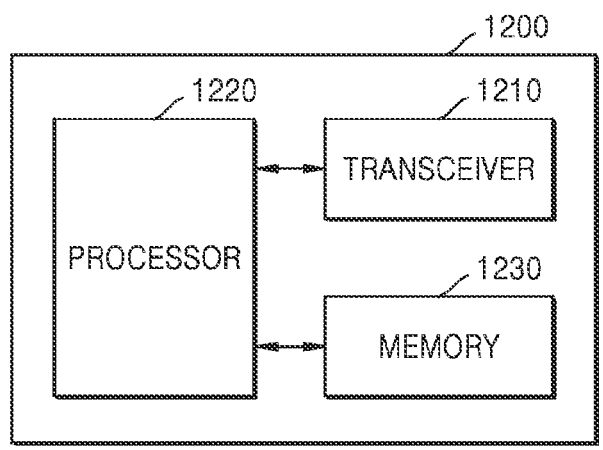
FIG. 12 illustrates a structure of a UE, according to an embodiment.

FIG. 12 illustrates a structure of a UE 1200, according to an embodiment.

Referring to FIG. 12, the UE 1200 may include a processor 1220, a memory 1230, and a transceiver 1210. However, elements of the UE 1200 are not limited thereto. For example, the UE 1200 may include more or fewer elements than those described above. The processor 1220, the memory 1230, and the transceiver 1210 may be implemented as a single chip.

The processor 1220 may include one or more processors. In this case, the one or more processors may include a general-purpose processor such as a CPU, an AP, or a DSP, a graphics processor such as a GPU or a VPU, or an AI processor such as an NPU. For example, when the one or more processors are AI processors, they may be designed as a hardware structure specialized in processing a particular AI model.

The processor 1220 may control a series of processes so that the UE 1200 operates according to an embodiment. For example, the processor 1220 may receive a control signal and a data signal through the transceiver 1210 and process the received control signal and data signal. The processor 1220 may transmit the processed control signal and data signal through the transceiver 1210. Furthermore, the processor 1220 may control input data derived from the received control signal and data signal to be processed according to a predefined operation rule or AI model stored in the memory 1230. The processor 1220 may write data to and read data from the memory 1230, may perform functions of a protocol stack required by communication standards, and may include at least one processor. A part of the transceiver 1210 or the processor 1220 may be referred to as a CP.

The memory 1230 may store a program and data required to operate the UE 1200, may store control information or data included in a signal obtained by the UE 1200, and may store control information or data included in a signal obtained by the UE 1200. The memory 1230 may include a storage medium such as a ROM, a RAM, a hard disk, a CD-ROM, and a DVD, or a combination thereof. The memory 1230 may not be separately provided but may be included in the processor 1220. The memory 1230 may include a volatile memory, a non-volatile memory, or a combination of a volatile memory and a non-volatile memory and may provide stored data according to a request of the processor 1220.

The transceiver 1210 may refer to a transmitter and a receiver, and the transceiver 1210 of the UE 1200 may transmit or receive signals to or from a BS or a network entity. The transmitted or received signals may include control information and data. To this end, the transceiver 1210 may include an RF transmitter for up-converting and amplifying a frequency of a transmitted signal, and an RF receiver for low-noise amplifying and down-converting a frequency of a received signal. However, this is merely an example of the transceiver 1210, and elements of the transceiver 1210 are not limited to the RF transmitter and the RF receiver. The transceiver 1210 may receive signals through wireless channels and output the signals to the processor 1220, and may transmit signals output from the processor 1220 through wireless channels.

A function related to AI herein is performed by a processor and a memory. The processor may include one or more processors. In this case, the one or more processors may include a general-purpose processor such as a CPU, an AP, or a DSP, a graphics processor such as a GPU or a VPU, or an AI processor such as an NPU. The one or more processors control input data to be processed according to a pre-defined operation rule or AI model stored in the memory. When the one or more processors are AI processors, they may be designed as a hardware structure specialized in processing a particular AI model.

The pre-defined operation rule or AI model may be created through learning, such that, as a basic AI model (or deep learning model) is trained by using a plurality of pieces of training data according to a learning algorithm, a pre-defined operation rule or AI model set to perform desired characteristics (or purposes) is created. Such learning may be performed on a device in which AI is conducted or may be performed through a separate server and/or system. Examples of the learning algorithm include, but are not limited to, supervised learning, unsupervised learning, semi-supervised learning, and reinforcement learning.

The AI model (or deep learning model) may include a plurality of neural network (NN) layers. Each of the plurality of NN layers has a plurality of weight values, and performs an NN operation through an operation between an operation result of a previous layer and the plurality of weight values. The weight values of the NN layers may be optimized through a result of training the AI model. For example, the plurality of weight values may be updated to reduce or minimize a loss value or a cost value obtained by the AI model during a training procedure. An artificial NN may include a deep NN (DNN), and may include, but is not limited to, a convolutional NN (CNN), a recurrent NN (RNN), a restricted Boltzmann machine (RBM), a deep belief network (DBN), a bidirectional recurrent deep NN (BRDNN), or a deep Q-network, Embodiments of the disclosure may be implemented or supported by one or more computer programs, each of which is formed from computer-readable program code and embodied in a computer-readable medium. The terms "application" and "program" used herein refer to one or more computer programs, software components, sets of instructions, procedures, functions, objects, classes, instances, related data, or a portion thereof adapted for implementation in suitable computer-readable program code. The phrase "computer-readable program code" includes any type of computer code, including source code, object code, and executable code. The phrase "computer-readable medium" may include any type of medium capable of being accessed by a computer, such as a read only memory (ROM), a random access memory (RAM), a hard disk drive (HDD), a compact disc (CD), a digital video disc (DVD), or any other type of memory.

A machine-readable storage medium may be provided as a non-transitory storage medium, which is a tangible device, and may exclude wired, wireless, optical, or other communication links that transmit transitory electrical or other signals. In this case, "non-transitory" does not distinguish whether data is semi-permanently or temporarily stored in the storage medium. For example, the "non-transitory storage medium" may include a buffer in which data is temporarily stored. A computer-readable medium may be an arbitrary available medium accessible by a computer and may include all volatile and non-volatile media and separable and non-separable media. A computer-readable medium includes media where data may be permanently stored and media where data may be stored and later overwritten, such as a rewritable optical disc or an erasable memory device.

Methods according to embodiments of the disclosure may be provided in a computer program product purchasable between a seller and a purchaser. The computer program product may be distributed in the form of machine-readable storage medium (e.g., a CD-ROM), or distributed (e.g., downloaded or uploaded) through an application store or directly or online between two user devices (e.g., smart phones). When distributed online, at least part of the computer program product (e.g., a downloadable application) may be temporarily generated or at least temporarily stored in a machine-readable storage medium, such as a memory of a server of a manufacturer, a server of an application store, or a relay server.

Various other effects directly or indirectly identified through this document may be provided.

The above description of the disclosure is provided for illustration, and it will be understood by one of ordinary skill in the art that various changes in form and details may be readily made therein without departing from important features and the scope of the disclosure as defined by the following claims. For example, the described techniques may be performed in a different order from the described method, and/or the described elements such as a system, structure, device, and circuit may be combined or integrated in a different form from the described method, or may be replaced or substituted by other elements or equivalents to achieve appropriate results. Hence, the embodiments of the disclosure should be considered in descriptive sense only and not for purposes of limitation. For example, each component described as a single type may be implemented in a distributed manner, and similarly, components described as distributed may be implemented in a combined form.

It will be understood that each block of flowchart illustrations and combinations of blocks in the flowchart illustrations may be implemented by computer program instructions. Because these computer program instructions may be loaded into a processor of a general-purpose computer, special purpose computer, or other programmable data processing equipment, the instructions, which are executed via the processor of the computer or other programmable data processing equipment generate means for performing the functions specified in the flowchart block(s). Because these computer program instructions may also be stored in a computer-executable or computer-readable memory that may direct the computer or other programmable data processing equipment to function in a particular manner, the instructions stored in the computer-executable or computer-readable memory may produce an article of manufacture including instruction means for performing the functions stored in the flowchart block(s). Because the computer program instructions may also be loaded into a computer or other programmable data processing equipment, a series of operational steps may be performed on the computer or other programmable data processing equipment to produce a computer implemented process, and thus, the instructions executed on the computer or other programmable data processing equipment may provide steps for implementing the functions specified in the flowchart blocks.

Each block may represent a module, segment, or portion of code, which includes one or more executable instructions for implementing specified logical function(s). It should also be noted that in some alternative implementations, the functions noted in the blocks may occur in a different order.

While the present disclosure has been described with reference to various embodiments, various changes may be made without departing from the spirit and the scope of the present disclosure, which is defined, not by the detailed description and embodiments, but by the appended claims and their equivalents.

What is claimed is:

1. An operating method of a base station (BS) for reporting channel state information (CSI) in a wireless communication system, the operating method comprising:
   receiving, from a user equipment (UE), information about capability of the UE;
   receiving, from the UE, information about the CSI measured based on a first CSI-reference signal (RS);
   determining, based on the information about the CSI, one autoencoder (AE) comprising an encoder that compresses at least one CSI data between the BS and the UE and a decoder that reconstructs the compressed at least one CSI data, from among a plurality of AEs, wherein the one AE is determined from among the plurality of AEs based on the information about the capability of the UE and a network environment identification (ID) included in the information about the CSI;
   transmitting, to the UE, information indicating the encoder included in the determined AE;
   transmitting a second CSI-RS to the UE;
   receiving, from the UE, CSI data compressed based on CSI measured using the second CSI-RS and the indicated encoder; and
   performing reconstruction based on the compressed CSI data and a decoder included in the determined AE,
   wherein the network environment ID indicates one network environment label corresponding to the CSI from among a plurality of classified network environment labels, and
   wherein the plurality of network environment labels are classified based on at least one of a deployment scenario, a signal-to-noise ratio (SNR) level, obstruction state information on a line of sight/non-line of sight (LOS/NLOS) state, UE mobility information, UE position information, or indoor/outdoor state information.

2. The operating method of claim 1, further comprising receiving, from the UE, information about capability of the UE,
   wherein the information about the CSI comprises CSI data, and
   wherein the one AE is determined from among the plurality of AEs based on the information about the capability of the UE and the CSI data included in the information about the CSI.

3. The operating method of claim 1, further comprising:
   receiving, from the UE, information about capability of the UE;
   receiving, from the UE, a sounding reference signal (SRS); and
   determining one AE from among the plurality of AEs based on the SRS and the information about the capability of the UE.

4. The operating method of claim 1, further comprising:
   transmitting, to the UE, information about a plurality of encoders; and
   receiving, from the UE, an encoder index identified based on the information about the plurality of encoders and information about capability of the UE,
   wherein the one AE is determined from among the plurality of AEs based on the encoder index and the information about the CSI.

5. The operating method of claim 1, further comprising:
   transmitting, to the UE, information about a plurality of encoders; and
   receiving, from the UE, an encoder index identified based on the information about the plurality of encoders and information about capability of the UE,
   wherein the one AE is determined from among the plurality of AEs based on the encoder index and a network environment identification (ID) included in the information about the CSI,
   wherein the network environment ID indicates one network environment label corresponding to the CSI from among a plurality of classified network environment labels, and
   wherein the plurality of network environment labels are classified based on at least one of a deployment scenario, a signal-to-noise ratio (SNR) level, obstruction state information on a line of sight/non-line of sight (LOS/NLOS) state, UE mobility information, UE position information, or indoor/outdoor state information.

6. The operating method of claim 1, further comprising:
   transmitting, to the UE, information about a plurality of encoders;
   receiving, from the UE, an encoder index identified based on the information about the plurality of encoders and information about capability of the UE; and
   receiving, from the UE, a sounding reference signal (SRS),
   wherein the one AE is determined from among the plurality of AEs based on the encoder index and the SRS.

7. An operating method of a user equipment (UE) for reporting channel state information (CSI) in a wireless communication system, the operating method comprising:
   transmitting, to BS, information about capability of the UE;
   identifying one network environment label corresponding to the CSI from among a plurality of classified network environment labels;

transmitting, to a base station (the BS), information about the CSI measured based on a first CSI-reference signal (RS), wherein the information about the CSI comprises a network environment identification (ID) indicating the identified one network environment label, and wherein the plurality of network environment labels are classified based on at least one of a deployment scenario, a signal-to-noise ratio (SNR) level, obstruction state information on a line of sight/non-line of sight (LOS/NLOS) state, UE mobility information, UE position information, or indoor/outdoor state information;

receiving, from the BS, information indicating an encoder included in one autoencoder (AE) determined based on the information about the CSI from among a plurality of AEs; and transmitting, to the BS, CSI compressed based on CSI measured using a second CSI-RS and the indicated encoder.

8. The operating method of claim 7, further comprising transmitting, to the BS, information about capability of the UE, wherein the information about the CSI comprises CSI data, and wherein the information indicating the encoder included in the one AE is further determined based on the information about the capability of the UE and the information about the CSI from among the plurality of AEs.

9. The operating method of claim 7, further comprising:
transmitting, to the BS, information about capability of the UE; and
transmitting, to the BS, a sounding reference signal (SRS).

10. The operating method of claim 7, further comprising:
receiving, from the BS, information about a plurality of encoders;
identifying an encoder index based on the information about the plurality of encoders and information about capability of the UE; and
transmitting, to the BS, the identified encoder index.

11. The operating method of claim 7, further comprising:
receiving, from the BS, information about a plurality of encoders;
identifying an encoder index based on the information about the plurality of encoders and information about capability of the UE;
transmitting, to the BS, the identified encoder index; and
identifying one network environment label corresponding to the CSI from among a plurality of classified network environment labels,
wherein the information about the CSI comprises a network environment ID indicating the identified one network environment label, and
wherein the plurality of network environment labels are classified based on at least one of a deployment scenario, a signal-to-noise ratio (SNR) level, obstruction state information on a line of sight/non-line of sight LOS/NLOS) state, UE mobility information, UE position information, or indoor/outdoor state information.

12. The operating method of claim 7, further comprising:
receiving, from the BS, information about a plurality of encoders;
identifying an encoder index based on information about capability of the UE and the information about the plurality of encoders;
transmitting, to the BS, the identified encoder index; and
transmitting, to the BS, a sounding reference signal (SRS).

13. A base station (BS) for reporting channel state information (CSI) in a wireless communication system, the BS comprising:
a transceiver; and
at least one processor coupled with the transceiver and configured to:
receive, from a user equipment (UE), information about capability of the UE;
receive, from the UE, information about the CSI measured based on a first CSI-reference signal (RS),
determine one AE comprising an encoder that compresses at least one CSI data between the BS and the UE and a decoder that reconstructs the compressed at least one CSI data from among a plurality of AEs based on the information about the CSI, wherein the one AE is determined from among the plurality of AEs based on the information about the capability of the UE and a network environment identification (ID) included in the information about the CSI,
transmit, to the UE, information indicating an encoder included in the determined AE,
transmit, to the UE, a second CSI-RS,
receive, from the UE, CSI compressed based on CSI measured using the second CSI-RS and the indicated encoder, and
perform reconstruction based on the compressed CSI and a decoder included in the determined AE,
wherein the network environment ID indicates one network environment label corresponding to the CSI from among a plurality of classified network environment labels, and
wherein the plurality of network environment labels are classified based on at least one of a deployment scenario, a signal-to-noise ratio (SNR) level, obstruction state information on a line of sight/non-line of sight (LOS/NLOS) state, UE mobility information, UE position information, or indoor/outdoor state information.

14. The BS of claim 13, wherein the at least one processor is further configured to:
receive, from the UE, information about capability of the UE, and
determine one AE from among the plurality of AEs based on the information about the capability of the UE and CSI data included in the information about the CSI.

15. The BS of claim 13, wherein the at least one processor is further configured to:
receive, from the UE, information about capability of the UE,
receive, from the UE, a sounding reference signal (SRS), and
determine one AE from among the plurality of AEs based on the SRS and the information about the capability of the UE.

16. The BS of claim 13, wherein the at least one processor is further configured to:
transmit, to the UE, information about a plurality of encoders,
receive, from the UE, an encoder index identified based on the information about the plurality of encoders and information about capability of the UE, and
determine one AE from among the plurality of AEs based on the encoder index and the information about the CSI.

17. A user equipment (UE) for reporting channel state information (CSI) in a wireless communication system, the UE comprising:
- a transceiver; and
- at least one processor coupled with the transceiver and configured to:
- transmit, to a base station (BS), information about capability of the UE, identify one network environment label corresponding to the CSI from among a plurality of classified network environment labels;
- transmit information about CSI measured based on a first CSI-reference signal, wherein the information about the CSI comprises a network environment identification (ID) indicating the identified one network environment label, and wherein the plurality of network environment labels are classified based on at least one of a deployment scenario, a signal-to-noise ratio (SNR) level, obstruction state information on a line of sight/non-line of sight (LOS/NLOS) state, UE mobility information, UE position information, or indoor/outdoor state information,
- receive, from a base station (BS), information indicating an encoder included in one autoencoder (AE) determined based on the information about the CSI from among a plurality of AEs, and
- transmit, to the BS, CSI compressed based on CSI measured using a second CSI-RS and the indicated encoder.

\* \* \* \* \*